US011699213B2

(12) United States Patent
Ban et al.

(10) Patent No.: US 11,699,213 B2
(45) Date of Patent: Jul. 11, 2023

(54) IMAGE-CAPTURING DEVICE AND METHOD FOR CONTROLLING SAME

(71) Applicant: Samsung Electronics Co., Ltd., Suwon-si (KR)

(72) Inventors: Jongmyeong Ban, Suwon-si (KR); Haedong Yeo, Suwon-si (KR); Hansung Lee, Suwon-si (KR); Soonhyuk Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 17/283,137

(22) PCT Filed: Oct. 11, 2019

(86) PCT No.: PCT/KR2019/013346
§ 371 (c)(1),
(2) Date: Apr. 6, 2021

(87) PCT Pub. No.: WO2020/085694
PCT Pub. Date: Apr. 30, 2020

(65) Prior Publication Data
US 2021/0390673 A1 Dec. 16, 2021

(30) Foreign Application Priority Data
Oct. 23, 2018 (KR) .................. 10-2018-0126860

(51) Int. Cl.
G06T 5/00 (2006.01)
G06T 7/80 (2017.01)
(Continued)

(52) U.S. Cl.
CPC ............ *G06T 5/001* (2013.01); *G06F 18/213* (2023.01); *G06T 5/20* (2013.01); *G06T 7/194* (2017.01);
(Continued)

(58) Field of Classification Search
CPC .. G06T 5/20; G06T 7/194; G06T 7/70; G06T 7/80; G06T 5/40; G06T 2207/20081;
(Continued)

(56) References Cited

U.S. PATENT DOCUMENTS 9,412,046 B2    8/2016  Shen et al.
9,569,697 B1 *  2/2017  McNerney ................ G06T 7/11
(Continued)

FOREIGN PATENT DOCUMENTS

CN    106851063    *  6/2017
JP    2014-068227 A    4/2014
(Continued)

OTHER PUBLICATIONS

W. Yin, T. Mei, C. W. Chen and S. Li, "Socialized Mobile Photography: Learning to Photograph With Social Context via Mobile Devices," in IEEE Transactions on Multimedia, vol. 16, No. 1, pp. 184-200, Jan. 2014, doi: 10.1109/TMM.2013.2283468. (Year: 2014).*
(Continued)

Primary Examiner — Andrae S Allison
(74) Attorney, Agent, or Firm — Jefferson IP Law, LLP

(57) ABSTRACT

The present disclosure relates to a tag and a method, performed by the tag, of transmitting a response signal to a tag search signal. Specifically, the disclosed method of transmitting a response signal includes operations of receiving, from at least one of a plurality of slave nodes, the tag search signal including identification data for identifying the tag, charging an energy storage element in the tag by using the received tag search signal, obtaining the identification data for identifying the tag from the received tag search signal, determining whether the obtained identification data matches identification information previously stored in the tag, and outputting a response signal to the tag search signal when the energy storage element is charged greater than a
(Continued)

predetermined value and the obtained identification data matches the identification information previously stored in the tag.

13 Claims, 22 Drawing Sheets

(51) Int. Cl.
    *G06T 7/194*     (2017.01)
    *G06T 7/70*     (2017.01)
    *G06T 5/20*     (2006.01)
    *G06F 18/213*     (2023.01)
    *G06V 10/44*     (2022.01)
    *G06T 5/40*     (2006.01)

(52) U.S. Cl.
    CPC .............. *G06T 7/70* (2017.01); *G06T 7/80* (2017.01); *G06V 10/454* (2022.01); *G06T 5/40* (2013.01); *G06T 2207/20081* (2013.01); *G06T 2207/20084* (2013.01)

(58) Field of Classification Search
    CPC . G06T 2207/20084; G06T 2207/20024; G06T 5/001; G06T 7/11; G06K 9/6232; G06N 3/0454; G06N 3/08; G06V 10/454
    See application file for complete search history.

(56) References Cited

U.S. PATENT DOCUMENTS

| | | | |
|---|---|---|---|
| 10,255,689 B2 | 4/2019 | Lee et al. | |
| 11,076,087 B2* | 7/2021 | Kim | H04N 5/232935 |
| 11,222,413 B2* | 1/2022 | Kim | G06K 9/6256 |
| 11,470,246 B2* | 10/2022 | Kang | H04N 5/23229 |
| 2014/0354768 A1* | 12/2014 | Mei | H04N 5/23222 348/222.1 |
| 2015/0370907 A1 | 12/2015 | Cleveland et al. | |
| 2016/0127653 A1* | 5/2016 | Lee | H04N 5/232935 348/239 |
| 2018/0260941 A1* | 9/2018 | Ma | H04N 5/23293 |
| 2019/0130545 A1* | 5/2019 | Cardei | G06V 10/60 |
| 2019/0222769 A1* | 7/2019 | Srivastava | H04N 5/2355 |
| 2019/0228273 A1* | 7/2019 | Merrill | G06N 3/084 |
| 2019/0279345 A1* | 9/2019 | Kim | G06K 9/6256 |

FOREIGN PATENT DOCUMENTS

| | | |
|---|---|---|
| KR | 10-2008-0076170 A | 8/2008 |
| KR | 10-2016-0051390 A | 5/2016 |
| KR | 10-2017-0098089 A | 8/2017 |
| KR | 10-2018-0051367 A | 5/2018 |
| KR | 10-2009-0111939 A | 10/2018 |
| WO | 2018/088794 A2 | 5/2018 |

OTHER PUBLICATIONS

International Search Report with Written Opinion and English translation dated Jan. 22, 2020; International Appln No. PCT/KR2019/013346.

Korean Office Action with English translation dated Feb. 11, 2022; Korean Appln. No. 10-2021-7005416.

Korean Office Action with English translation dated Aug. 2, 2022; Korean Appln. No. 10-2021-7005416.

* cited by examiner

FIG. 11

| Key 1020 | Value 1040 | Description 1060 |
|---|---|---|
| TIME 1021 | 1537341505 (18/09/19 16:18:25KST) | TIME OF IMAGE ACQUISITION (TIMESTAMP) |
| LOCATION AND PLACE 1022 | GPS (20.13378,67.48913), UYUNI DESERT | PLACE OF IMAGE ACQUISITION |
| FRONT AND REAR CAMERAS 1023 | REAR CAMERA #1, FRONT CAMERA #2 | FRONT/REAR CAMERA INFORMATION |
| WEATHER 1024 | CLEAR | WEATHER INFORMATION |
| INDOOR/ OUTDOOR 1025 | OUTDOOR | ESTIMATE INDOOR/OUTDOOR VIA WIFI/GPS |
| CAMERA OPTION 1026 | AUTOMATIC (AO), MANUAL (MO) | OPTION SET IN CAMERA APP |
| FAVORITE FILTER 1027 | PERSON: F1, ANIMAL: F2 | FAVORITE FILTER (STYLE) INFORMATION FOR EACH OBJECT |
| ⋮ | ⋮ | ⋮ |

IMAGE-CAPTURING DEVICE AND METHOD FOR CONTROLLING SAME

TECHNICAL FIELD

The present disclosure relates to an artificial intelligence (AI) system and an application thereof for simulating functions of a human brain such as cognition and decision-making by using machine learning algorithms such as deep learning. Specifically, the present disclosure relates to a device for obtaining images by using an AI system and a control method of the device.

BACKGROUND ART

An artificial intelligence (AI) system is a computer system that realizes human-level intelligence, and enables machines to become smart by learning and making decisions on their own, unlike existing rule-based smart systems. An AI system may improve its recognition rates and is capable of understanding a user's preferences more accurately through experience. Thus, existing rule-based smart systems are increasingly being replaced by deep learning-based AI systems.

AI technology consists of machine learning (deep learning) and element technologies using machine learning.

Machine learning is an algorithmic technique for autonomously classifying/learning features of input data, and element technologies are technologies using machine learning algorithms such as deep learning and include technical fields such as linguistic understanding, visual understanding, reasoning/prediction, knowledge representation, motion control, etc.

Various technical fields to which AI technology is applied are as follows. Linguistic understanding is a technology for recognizing and applying/processing human language/characters and includes natural language processing, machine translation, a dialog system, question answering, speech recognition/synthesis, etc. Visual understanding is a technology for recognizing and processing an object, in the same way as performed by a human visual system, and includes object recognition, object tracking, image retrieval, person recognition, scene understanding, spatial understanding, image enhancement, etc. Reasoning/prediction is a technology for judging information and logically inferring and predicting new information and includes knowledge/probability-based inferring, optimization prediction, preference-based planning, recommendations, etc. Knowledge representation is a technology for automatically processing information about human experience as knowledge data and includes knowledge construction (data generation/classification), knowledge management (data utilization), etc. Motion control is a technology for controlling autonomous driving of a vehicle and motion of a robot and includes movement control (navigation, collision avoidance, and travelling), manipulation control (action control), etc.

Furthermore, AI technology may be used to obtain images such as a photos or videos.

DESCRIPTION OF EMBODIMENTS

Technical Problem

According to embodiments of the present disclosure, a device for obtaining an image by using an artificial intelligence (AI) system and a control method of the device may be provided.

Solution to Problem

According to an embodiment, a method, performed by an electronic device, of obtaining an image may be provided, which includes: obtaining a first image including at least one object and a background; detecting the at least one object and the background in the obtained first image, based on feature information regarding the at least one object and the background in the first image; determining image filters exhibiting different image effects, which are to be applied to each of the detected at least one object and the detected background; and generating a second image by applying the determined image filters to each of the at least one object and the background.

According to an embodiment, an electronic device may be provided, which includes: a display displaying at least one image; a storage storing one or more instructions; and a processor configured to execute the one or more instructions to: obtain a first image including at least one object and a background; detect the at least one object and the background in the obtained first image, based on feature information regarding the at least one object and the background in the first image; determine image filters exhibiting different image effects, which are to be applied to each of the detected at least one object and background; and generate a second image by applying the determined image filters to each of the at least one object and the background.

According to an embodiment, a computer program product including a non-transitory computer-readable storage medium having recorded thereon a method of obtaining an image may be provided, wherein the computer-readable storage medium includes instructions for performing operations of: obtaining a first image including at least one object and a background; detecting the at least one object and the background in the obtained first image, based on feature information regarding the at least one object and the background in the first image; determining image filters exhibiting different image effects, which are to be applied to each of the detected at least one object and the detected background; and generating a second image by applying the determined image filters to each of the at least one object and the background.

Advantageous Effect of Disclosure

According to the present disclosure, an electronic device for obtaining an image is capable of generating an image by using image filters exhibiting image effects that match a user intent.

BRIEF DESCRIPTION OF DRAWINGS

FIG. 11 is a diagram illustrating examples of pieces of additional information used by an electronic device, according to an embodiment.

BEST MODE

Figure 1:
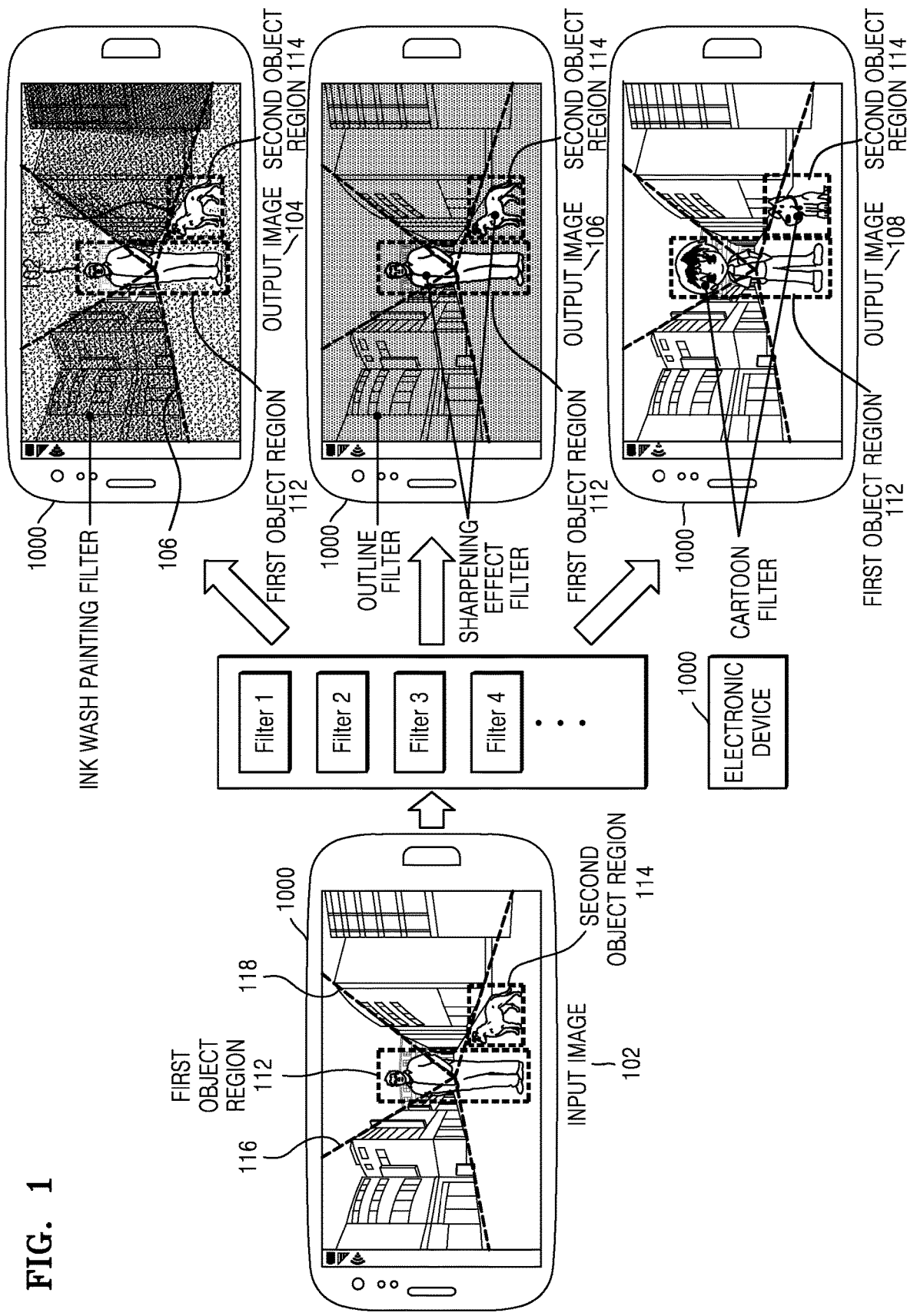
FIG. 1 is a diagram for explaining an image obtaining method performed by an electronic device, according to an embodiment.

According to an embodiment, a method, performed by an electronic device, of obtaining an image includes: obtaining a first image including at least one object and a background; detecting the at least one object and the background in the obtained first image, based on feature information regarding the at least one object and the background in the first image; determining image filters exhibiting different image effects, which are to be applied to each of the detected at least one object and the detected background; and generating a second image by applying the determined image filters to each of the at least one object and the background.

According to an embodiment, an electronic device includes: a display displaying at least one image; a storage storing one or more instructions; and a processor configured to execute the one or more instructions to: obtain a first image including at least one object and a background; detect the at least one object and the background in the obtained first image, based on feature information regarding the at least one object and the background in the first image; determine image filters exhibiting different image effects, which are to be applied to each of the detected at least one object and the detected background; and generate a second image by applying the determined image filters to each of the at least one object and the background.

According to an embodiment, a non-transitory computer-readable recording medium having recorded thereon a program for performing operations of: obtaining a first image including at least one object and a background; detecting the at least one object and the background in the obtained first image, based on feature information regarding the at least one object and the background in the first image; determining image filters exhibiting different image effects, which are to be applied to each of the detected at least one object and the detected background; and generating a second image by applying the determined image filters to each of the at least one object and the background.

MODE OF DISCLOSURE

Terms used in the present specification will now be briefly described and then embodiments of the present disclosure will be described in detail.

As the terms used herein, general terms that are currently widely used are selected by taking functions in the present disclosure into account, but the terms may have different meanings according to an intention of one of ordinary skill in the art, precedent cases, advent of new technologies, etc. Furthermore, specific terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the present disclosure.

Throughout the specification, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation and may be embodied as hardware or software or a combination of hardware and software.

Embodiments of the present disclosure will now be described more fully hereinafter with reference to the accompanying drawings so that they may be easily implemented by one of ordinary skill in the art. However, the present disclosure may have different forms and should not be construed as being limited to the descriptions set forth herein. Parts not related to descriptions of the present disclosure are omitted to clearly explain embodiments of the present disclosure in the drawings, and like reference numerals denote like elements throughout.

FIG. 1 is a diagram illustrating an image obtaining method performed by an electronic device 1000, according to an embodiment.

Referring to FIG. 1, the electronic device 1000 may obtain an image by using a camera included in the electronic device 1000. The electronic device 1000 may obtain a first image by using the camera and generate a second image based on the obtained first image. According to an embodiment, the first image obtained by the electronic device 1000 may include a preview image displayed on a display of the electronic device 1000 and a prestored image stored in a memory of the electronic device 1000 or received from a server, and the second image may include an image obtained by correcting the first image based on image filters exhibiting different image effects.

The first image obtained by the electronic device 1000 may include at least one object and a background. For example, the first image may include first and second object regions 112 and 114 respectively including images of portions corresponding to the at least one object, and the electronic device 1000 may detect the first and second object regions 112 and 114 in the first image obtained by the electronic device 1000. According to the present disclosure, an object region may be a region including pixels for a portion corresponding to an object in the first image, and a background region may be a region including pixels for a portion corresponding to a background in the first image.

The electronic device 1000 according to the present disclosure may apply image filters exhibiting different image effects to the first object region 112, the second object region 114, and the background region obtained by removing the first and second object regions 112 and 114 from the obtained first image. For example, referring to an output image 104 of FIG. 1, the electronic device 1000 may display an ink wash painting effect in the background region, which is obtained by removing the first and second regions 112 and 114 from the obtained first image, by applying an ink wash painting filter to the background region.

Furthermore, referring to an output image 106, the electronic device 1000 may display an object clearly by applying a sharpening effect filter to the first and second object regions 112 and 114 and display an outline of lines constituting the background region by applying an outline filter to the background region. In addition, referring to an output image 108, the electronic device 1000 may display a plurality of objects in the first image as characters by applying a cartoon filter to the first and second object regions 112 and 114.

According to another embodiment, the first image obtained by the electronic device 1000 may further include at least one reference line for determining a composition of the first image. For example, the electronic device 1000 may generate a reference line for determining the composition of the first image from the obtained first image, segment the first image into a plurality of regions by using the generated reference line, and generate the second image by applying image filters exhibiting different image effects to the plurality of regions. Reference lines generated by the electronic device 1000 according to the present disclosure may mean a plurality of vanishing lines intersecting at a vanishing point in the first image. The vanishing point described in the present specification may refer to a point at which parallel straight lines in a physical space appear to converge in perspective when the parallel straight lines are projected on an image.

According to an embodiment, image effects to be displayed by the electronic device 1000 using image filters applied to each of the at least one object and the background in the first image may include, but are not limited thereto, an ink wash painting effect, a blur effect, a sharpening effect, an outline effect, a cartoon effect, a three-dimensional (3D) effect, a noise removal effect, a noise addition effect, a mosaic effect, a fresco effect, a pastel effect, a paint effect, a sponge effect, a watercolor painting effect, a black-and-white effect, etc.

According to an embodiment, the electronic device 1000 may generate the second image by applying a plurality of filters to the first image according to a deep learning algorithm having a deep neural network (DNN) architecture with multiple layers. A deep learning algorithm may be basically formed as a DNN architecture with multiple layers. Neural networks used by the electronic device 1000 according to the present disclosure may include a convolutional neural network (CNN), a DNN, a recurrent neural network (RNN), and a bidirectional recurrent DNN (BRDNN), but are not limited thereto. According to an embodiment, a neural network used by the electronic device 1000 may be an architecture in which a fully-connected layer is connected to a CNN architecture in which convolutional layers and pooling layers are repetitively used.

According to another embodiment, the electronic device 1000 may use a plurality of neural networks to generate a second image by applying a plurality of filters to a first image. For example, the electronic device 1000 may detect the at least one object and the background in the obtained first image by using a first neural network and determine a plurality of filters to be applied to the first image by using a second neural network.

According to an embodiment, the electronic device 1000 may be implemented in various forms. Examples of the electronic device 1000 described in the present specification may include a digital camera, a mobile terminal, a smart phone, a laptop computer, a tablet PC, an electronic book terminal, a digital broadcasting terminal, a personal digital assistant (PDA), a portable multimedia player (PMP), a navigation device, an MP3 player, etc., but are not limited thereto.

The electronic device 1000 described in the present specification may be a wearable device that may be worn by a user. Wearable devices include at least one of an accessory type device (e.g. a watch, a ring, a wristband, an ankle band, a necklace, glasses, and contact lenses), a head-mounted-device (HMD), a textile- or garment-integrated device (e.g., an electronic garment), a body-attachable device (e.g., a skin pad), or a bio-implantable device (e.g., an implantable circuit), but is not limited thereto. Hereinafter, for convenience, an example in which the electronic device 1000 is a smart phone will be described.

Figure 2:
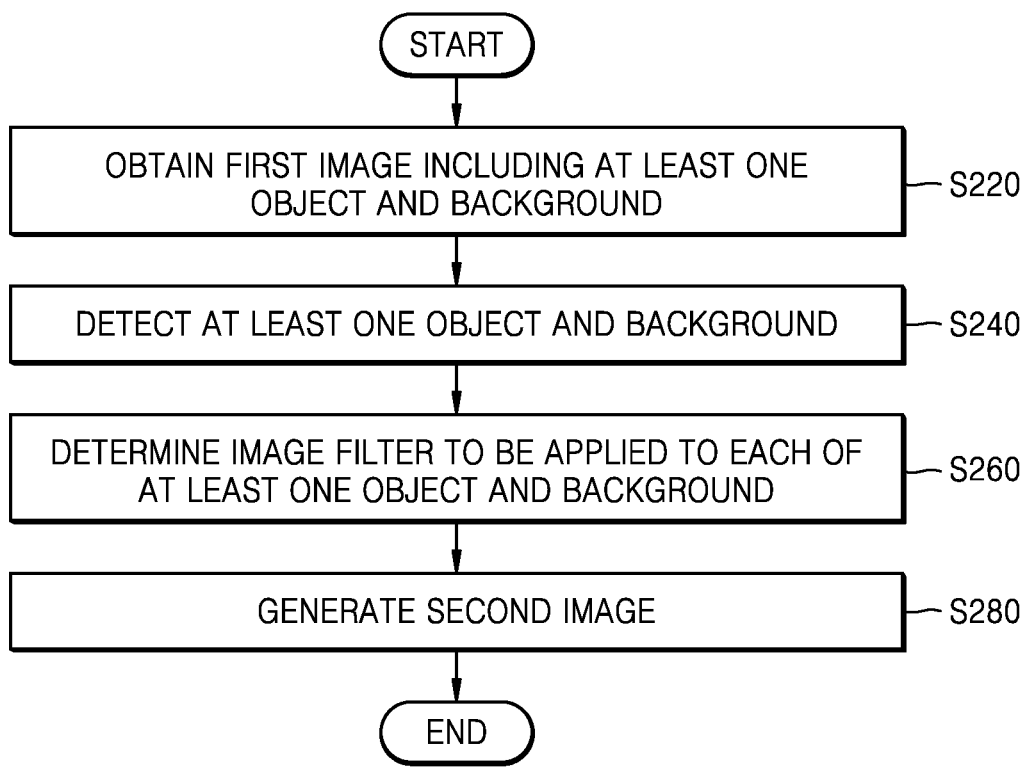
FIG. 2 is a flowchart of a method, performed by an electronic device, of obtaining an image, according to an embodiment.

FIG. 2 is a flowchart of a method, performed by the electronic device 1000, of obtaining an image, according to an embodiment.

In operation S220, the electronic device 1000 may obtain a first image including at least one object and a background. For example, the electronic device 1000 may obtain the first image by using a camera included in the electronic device 1000 but from an external server or other electronic device connected by using at least one of wired and wireless connections. The first image obtained by using the camera may include a preview image for obtaining a final image to be stored in the electronic device 1000, and the preview image may be displayed on the display of the electronic device 1000 or an external display device connected by using at least one of wired and wireless connections.

In operation S240, the electronic device 1000 may detect the at least one object and the background in the obtained first image. For example, the electronic device 1000 may obtain pieces of feature information regarding the at least one object and the background, respectively, in the obtained first image, and detect the at least one object and the background in the first image based on the obtained pieces of feature information. Detecting, by the electronic device 1000 according to the present disclosure, the at least one object and the background in the first image may be determining locations of at least one object region and a background region included in the first image and determining types of objects and a background respectively included in the at least one object region and the background region whose locations have been determined. According to another embodiment, the electronic device 1000 may detect the at least one object and the background in the first image by using an object model and a background model that are pre-trained and stored in the electronic device 1000.

According to another embodiment, when the obtained first image is input to a first neural network, the electronic device 1000 may obtain pieces of feature information regarding the at least one object and the background, respectively, by using the first neural network that outputs feature information for identifying an object region including an image of a portion corresponding to the at least one object and a background region including an image of a portion corresponding to the background and detect the at least one object and the background in the first image based on the obtained pieces of feature information. The first neural network according to the present disclosure may be trained based on an object model and a background model that is pre-trained and stored in the electronic device 1000. Furthermore, the feature information according to the present disclosure may include information about types of the at least one object and the background in the first image and information for determining locations of the at least one object region and background region in the first image.

The electronic device 1000 may display a mark indicating the detected at least one object and background. For example, the electronic device 1000 may display, together with the first image, the mark indicating the detected at least one object and background on a display included in the electronic device 1000 or a display device connected by using at least one of wired and wireless connections. According to an embodiment, the electronic device 1000 may display the mark indicating the detected at least one object and background in various ways. For example, the electronic device 1000 may display the mark such as a star-shaped symbol or numerical symbol in close proximity of an object region including the at least one object and a background region including the background.

In operation S260, the electronic device 1000 may determine image filters to be applied to each of the detected at least one object and background. For example, the electronic device 1000 may determine an image filter for each of the at least one object and the background in the first image in order to show different image effects on the at least one object and the background. According to an embodiment, when pieces of feature information regarding the at least one object and the background, respectively, are input to a second neural network, the electronic device 1000 may determine image filters by using the second neural network that outputs the image filters to be applied to the first image.

In operation S280, the electronic device 1000 may generate a second image by applying the determined image filters to each of the at least one object and the background. According to an embodiment, the electronic device 1000 may store the generated second image in a memory of the electronic device 1000 or in a server or another electronic device connected to the electronic device 1000. In particular, the electronic device 1000 according to the present disclosure may apply a plurality of image filters in an overlapping manner to each of the detected at least one object region and the detected background region. For example, a sharpening effect filter and an outline filter may be applied to the first object region 112 in an overlapping manner, and an ink wash painting filter and a black and white filter may be applied to the second object region 114 in an overlapping manner.

According to another embodiment, the electronic device 1000 may adjust, prior to operation S280, a size and an application range of an image filter determined for each of the at least one object and the background and generate a second image by applying the image filter with the adjusted size and application range for each of the at least one object region and the background region in the first image. Furthermore, after operation S280 of generating the second image, the electronic device 1000 may obtain a feedback on the generated second image from the user. According to an embodiment, the electronic device 1000 may retrain the second neural network by refining, based on the obtained feedback, weights for layers in the second neural network and a strength of connections between the layers.

Figure 3:
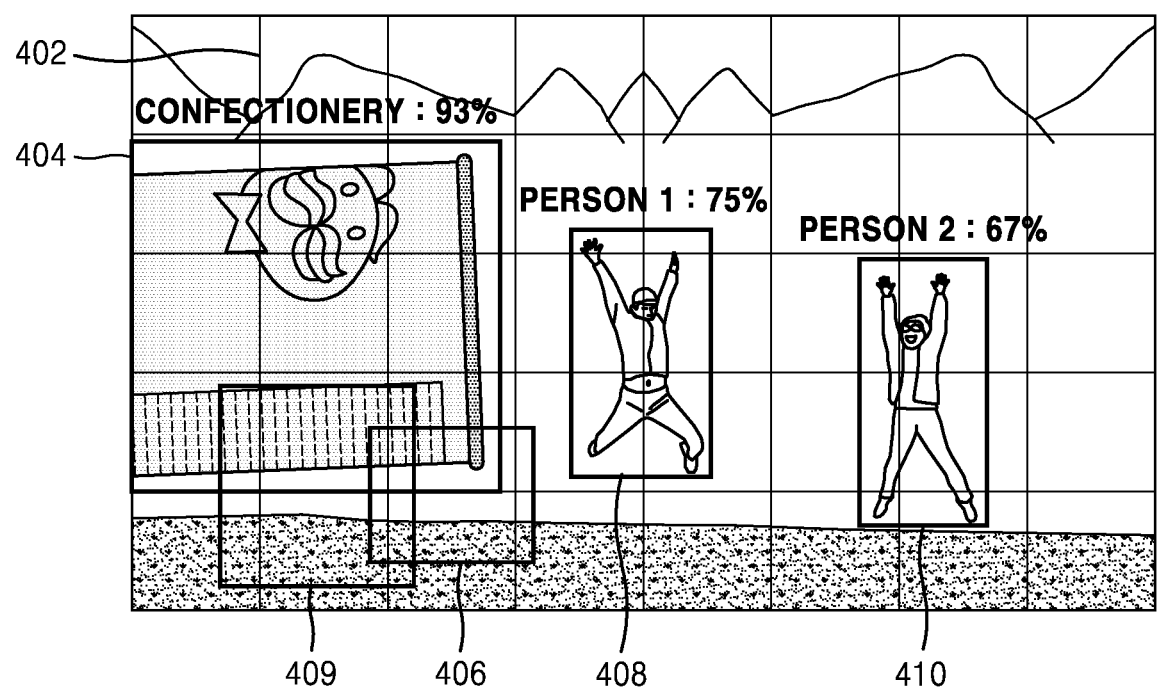
FIG. 3 is a diagram for explaining a method, performed by an electronic device, of determining location information regarding at least one object region and a background region included in a first image, according to an embodiment.

FIG. 3 is a diagram for explaining a method, performed by the electronic device 1000, of determining location information regarding at least one object region and a background region included in a first image, according to an embodiment.

According to an embodiment, the electronic device 1000 may obtain a first image and re-size the obtained first image to a predefined size. The electronic device 1000 may segment the re-sized first image into grid cells 402 having a predetermined size. The electronic device 1000 according to the present disclosure may re-size the obtained first image to a size required for the first neural network in order to determine location information for detecting at least one object region and a background region in the first image. According to an embodiment, the electronic device 1000 may generate 40 grid cells, but is not limited thereto.

According to an embodiment, the electronic device 1000 may generate a preset number of boundary cells 406 and 409 that are subordinate to each of the grid cells by using a first neural network that takes the first image as an input and obtain coordinates of a center of each of the generated boundary cells 406 and 409 and a probability that at least one object is included in the boundary cells 406 and 409. According to an embodiment, the electronic device 1000 may generate two boundary cells for each of the generated grid cells, and the number of boundary cells subordinate to each of the grid cells may vary.

According to an embodiment, each of the generated boundary cells may be identified using information about coordinates of a center of a corresponding boundary cell and a probability that an image corresponding to each of the at least one object (e.g., pixels representing pixel values of an image corresponding to an object) exists within the boundary cell. The electronic device 1000 may detect, as object regions, boundary cells (404, 408, and 410) having a highest probability that an image corresponding to an object exists therein from among boundary cells generated using the first neural network.

For example, the electronic device 1000 may detect, as an object region, the boundary cell 404 having a highest probability of an object existing therein from among the boundary cells 404, 406, and 409 that include, in an overlapping manner, an image corresponding to each of the at least one object (e.g., an image showing confectionery) in the first image. To achieve this, the electronic device 1000 may remove the boundary cells 406 and 409 including the image corresponding to the at least one object based on whether a probability that the image (e.g., a pixel) corresponding to the at least one object exists in each of the boundary cells 404, 406, and 409 is greater than or equal to a preset threshold. According to an embodiment, the electronic device 1000 uses a non-maximal suppression (NMS) algorithm to remove a boundary cell with a probability that an image corresponding to an object exists therein, which is less than the preset threshold.

The electronic device 1000 may detect at least one object region in the first image by repeating a process of detecting, as an object region, a boundary cell having a highest probability that an object exists therein from among boundary cells that include, in an overlapping manner, an image corresponding to at least one object in the first image. The electronic device 1000 may determine location information for determining an object region by using boundary cells corresponding to each of the at least one object existing in the first image.

For example, the electronic device 1000 may set an origin for setting coordinates in the first image and obtain, based on the set origin, coordinates of a center pixel in detected boundary cells and coordinates of boundary pixels therein. The electronic device 1000 may determine location information regarding object regions by using coordinates of a central pixel and coordinates of boundary pixels in a boundary cell set for each of the at least one object in the first image. In addition, the electronic device 1000 may determine location information regarding background regions by using coordinates of a central pixel and boundary pixels in a boundary cell corresponding to each of the at least one object in the first image and coordinates of all boundary pixels in the first image.

Figure 4:
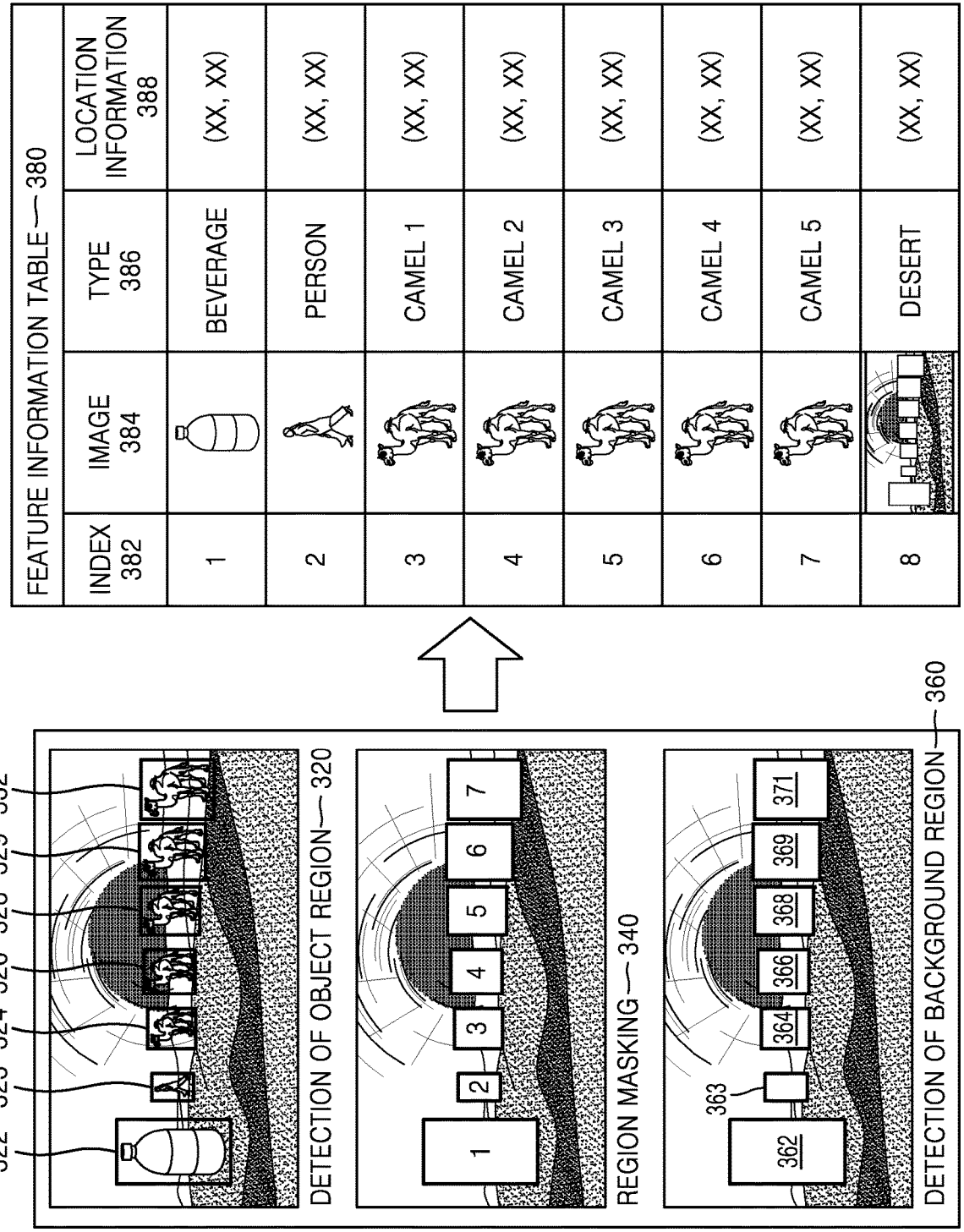
FIG. 4 is a diagram for explaining a method, performed by an electronic device, of obtaining feature information from an image, according to an embodiment.

FIG. 4 is a diagram for explaining a method, performed by the electronic device 1000, of obtaining feature information from an image, according to an embodiment.

According to an embodiment, the electronic device 1000 may detect at least one object region 322, 323, 324, 326, 328, 329, and 332 in a first image by using determined location information regarding object regions and obtain feature information regarding an object by using at least one of location information indicating locations of object regions and information about types of objects included in the detected at least one object region 322, 323, 324, 326, 328, 329, and 332. Furthermore, the electronic device 1000 may obtain feature information regarding a background by using at least one of location information indicating a location of a background region and information about a type of a background included in a detected background region. The electronic device 1000 may detect at least one object and a background in the first image based on the pieces of feature information regarding the at least one object and the background, respectively. Hereinafter, a method of obtaining pieces of feature information regarding an object and a background, respectively, will be described in detail.

For example, the electronic device 1000 may detect at least one object region 322, 323, 324, 326, 328, 329, and 332 by using location information regarding the at least one object region 322, 323, 324, 326, 328, 329, and 332, which is determined using a first neural network, and determine types of objects included in the detected at least one object region 322, 323, 324, 326, 328, 329, and 332. The electronic device 1000 may obtain feature information regarding an object by using location information regarding detected at least one object region and information about types of objects included in the detected at least one object region.

In addition, the electronic device 1000 may mask object regions detected using location information regarding the object regions to distinguish the detected object regions from a region in which object regions are not detected. For example, the electronic device 1000 may mask at least one detected object region by dividing the at least one detected object region and a region in which object regions are not detected into two pieces of color information. In the present specification, masking detected at least one object region by the electronic device 1000 may correspond to binary processing of values of pixels included in the detected at least one object region.

The electronic device 1000 according to the present disclosure may detect a background region by removing the at least one masked object region from the first image. In other words, the electronic device 1000 may detect at least one object region based on location information regarding the at least one object region and then detect a background region in the first image by removing the detected at least one object region from the first image. According to another embodiment, the electronic device 1000 may determine location information for determining a background region by using location information regarding masked at least one object region and coordinates of all boundary pixels in the first image and detect a background region by using the location information for determining a background region.

According to another embodiment, the electronic device 1000 may determine pieces of location information respectively indicating locations of at least one object region and a background region in the obtained first image and directly detect an object region and a background region in the first image by using the determined pieces of location information regarding the at least one object region and the background region, respectively. That is, instead of using a method of removing detected at least one object region from the first image, the electronic device 1000 may detect at least one object region and a background region in the first image based on pieces of location information regarding the at least one object region and the background region, respectively. The electronic device 1000 according to the present disclosure may determine a type of a background included in a background region detected based on location information regarding the background region. The electronic device 1000 may obtain feature information regarding the background by using the determined type of background included in the background region and the location information regarding the background region In other words, the electronic device 1000 may determine information about types of at least one object and background respectively included in the at least one object region and background region in the obtained first image and obtain feature information by using at least one of the determined information about the types of at least one object and background and the determined location information regarding the at least one object region and background region. Feature information according to the present disclosure may be obtained for each of at least one object and background. For example, feature information regarding a background may include at least one of location information regarding a background region and information about a type of the background included in the background region, and feature information regarding an object may include at least one of location information regarding an object region and information about a type of the object included in the object region.

The electronic device 1000 according to the present disclosure may generate a feature information table 380 by using pieces of feature information respectively obtained for at least one object and a background. For example, the feature information table 380 generated by the electronic device 1000 may include categories for an index 382, an image 384, a type 386, and location information 388. For example, the category for index 382 may indicate an identification number for distinguishing between the detected object and background, the category for image 384 may indicate information about values of pixels representing at least one object and background, the category for type 386 may indicate a type of an object or background included in each of at least one object region and background region, and the category for location information 388 may indicate pieces of location information regarding the at least one object region and the background region, respectively.

Figure 5:
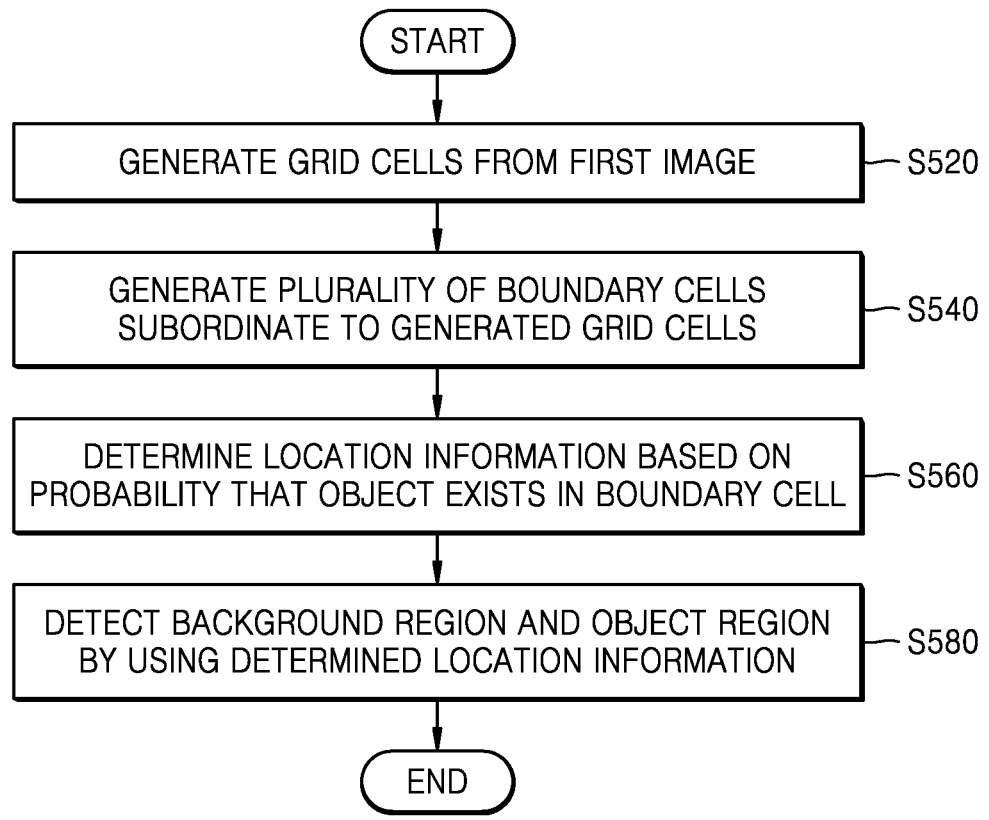
FIG. 5 is a flowchart of a method, performed by an electronic device, of detecting at least one object region and a background region in an image, according to an embodiment.

FIG. 5 is a flowchart of a method, performed by the electronic device 1000, of detecting at least one object region and a background region in an image, according to an embodiment.

In operation S520, the electronic device 1000 may segment an obtained first image to generate a plurality of grid cells. For example, the electronic device 1000 may re-size an obtained first image and segment the re-sized first image to generate grid cells having a predetermined size. According to an embodiment, the electronic device 1000 may generate a plurality of grid cells by inputting the obtained first image to a first neural network.

In operation S540, the electronic device 1000 may generate a plurality of boundary cells subordinate to the generated grid cells. In operation S540, the boundary cells generated by the electronic device 1000 are subordinate to the generated grid cells and indicate a probability that an image corresponding to at least one object exists in the boundary cells.

In operation S560, the electronic device 1000 may determine location information indicating a location of an object region based on a probability that an image (e.g., a pixel) corresponding to an object exists in the generated boundary cells. For example, the electronic device 1000 may segment the first image to generate forty (40) grid cells and generate two (2) boundary cells (40*2=80) that are subordinate to each of the generated grid cells. When there are boundary cells including at least one object in the first image in an overlapping manner, the electronic device 1000 may determine a boundary cell per image corresponding to an object using an NMS algorithm and determine location information of an object region by using coordinates of a center of the determined boundary cell and coordinates of boundary pixels in the boundary cell.

In operation S580, the electronic device 1000 may detect at least one object region in the first image by using the location information of the object region. For example, the electronic device 1000 may detect a background region by removing the detected object region from the first image. In other words, the electronic device 1000 may first determine location information for determining the object region in the obtained first image and then detect the object region and the background region in the first image based on the determined location information. According to another embodiment, the electronic device 1000 may first determine pieces of location information for determining the object region and the background region in the obtained first image and then detect the object region and the background region in the first image based on the determined pieces of location information.

Figure 6:
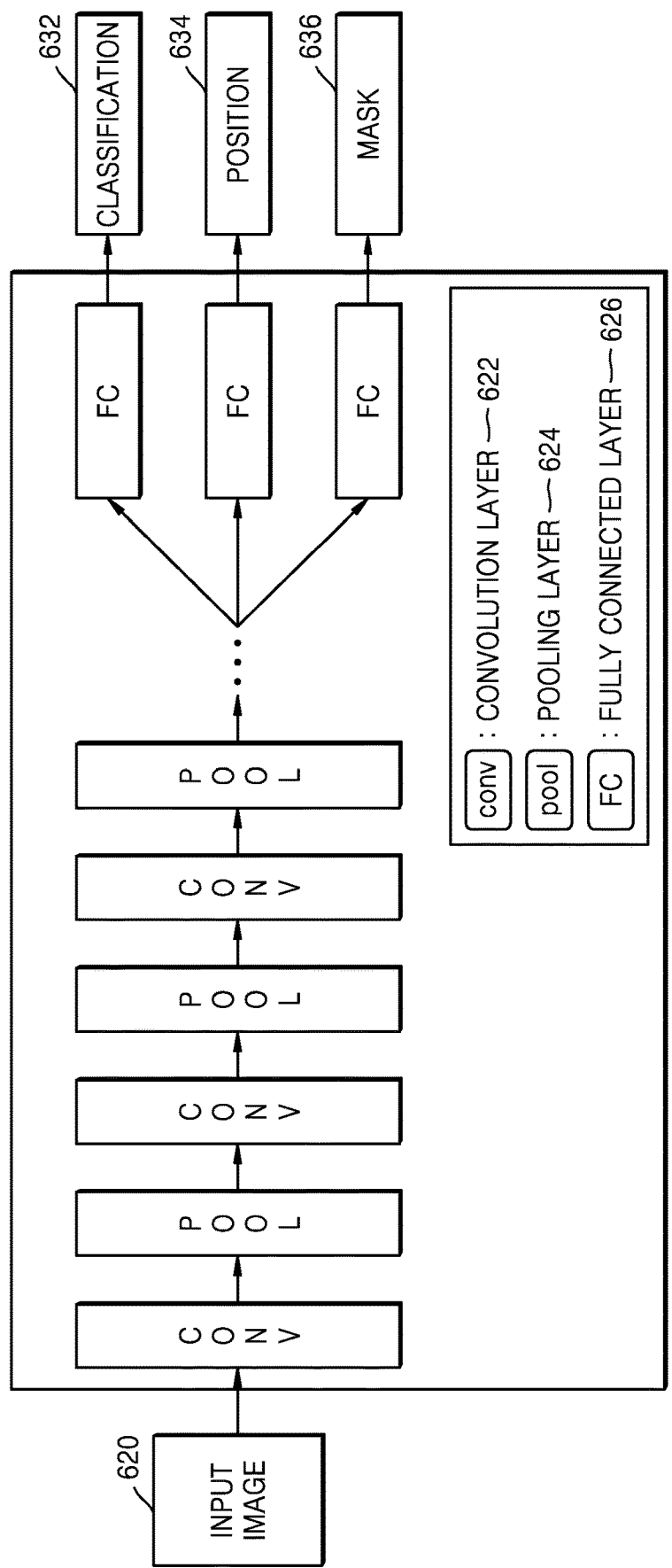
FIG. 6 is a diagram for explaining a structure of a neural network used by an electronic device, according to an embodiment.

FIG. 6 is a diagram for explaining an architecture of a neural network used by the electronic device 1000, according to an embodiment.

A first neural network used by the electronic device 1000 according to the present disclosure to obtain feature information regarding each of at least one object and background in a first image may include at least one convolutional layer that extracts convolutional features by performing a convolution operation, a fully connected layer that is connected to one end of the at least one convolution layer and outputs information about types of an object and a background respectively included in detected at least one object region and background region, a fully connected layer representing pieces of location information regarding the at least one object region and the background region, and a fully connected layer that outputs the masked at least one object region and the background region. Furthermore, the first neural network may further include pooling layers alternately arranged with the at least one convolutional layer in addition to the at least one convolutional layer and the fully connected layers.

In addition, the electronic device 1000 according to the present disclosure may determine filters to be applied to each of the at least one object and the background in the first image by inputting pieces of feature information regarding the at least one object region and the background region, respectively, to a second neural network. According to an embodiment, the electronic device 1000 may use a plurality of neural network models to generate a second image by applying an image filter exhibiting a different image effect to each of at least one object and a background included in the obtained first image, but may generate the second image using a single neural network model. In other words, the first and second neural networks used by the electronic device 1000 may be formed as a single neural network model.

A neural network model used by the electronic device 1000 to generate the second image may be an artificial intelligence (AI) model operating to process input data according to predefined operation rules stored in a memory of the electronic device 1000, and the neural network model may consist of a plurality of neural network layers. Each of the plurality of neural network layers has a plurality of weight values and may perform neural network computations via calculations between a result of computations in a previous layer and the plurality of weight values. A plurality of weight values assigned to each of the plurality of neural network layers may be optimized by a result of training the AI model. For example, a plurality of weight values may be refined to reduce or minimize a loss or cost value obtained in the AI model during a training process. An artificial neural network may include a DNN, and may be, for example, a CNN, a DNN, a RNN, a restricted Boltzmann machine (RBM), a deep belief network (DBN), a BRDNN, or a deep Q-network (DQN) but is not limited thereto.

Figure 7:
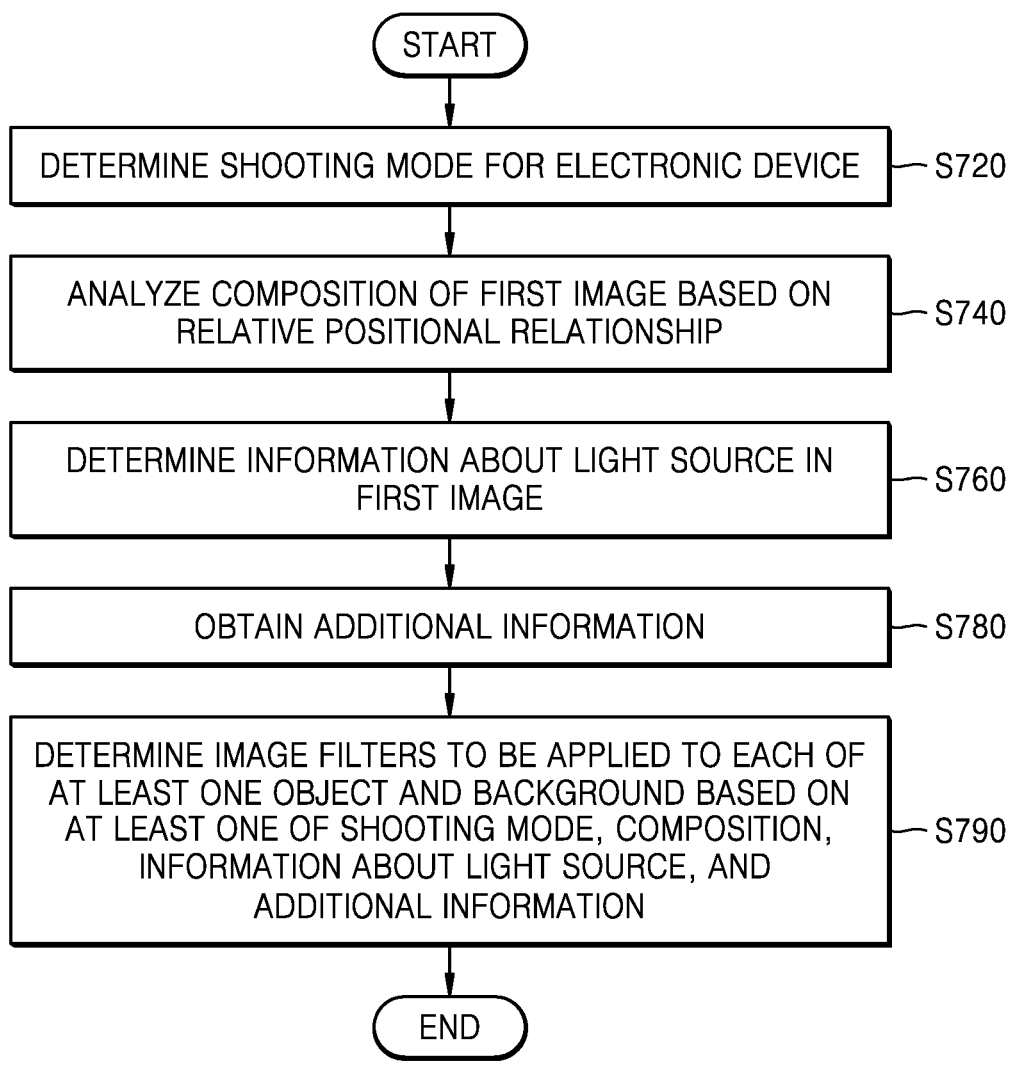
FIG. 7 is a flowchart of a method, performed by an electronic device, of obtaining an image, according to another embodiment.

FIG. 7 is a flowchart of a method, performed by the electronic device 100, of obtaining an image, according to another embodiment.

In operation S720, the electronic device 1000 may determine its shooting mode for capturing a first image by using pieces of feature information regarding at least one object and a background, respectively, in the first image. For example, the electronic device 1000 may determine its shooting mode for capturing the first image by using a neural network trained based on a pre-trained shooting model.

For example, the electronic device 1000 may determine a shooting mode suitable for capturing a first image based on feature information on an object and a background included in the first image, and shooting modes according to the present disclosure may include a close-up mode, a handwriting mode, a landscape mode, a night scene mode, a tripod mode, a sports mode, a night portrait mode, and a backlight mode, but are not limited thereto. In addition, the shooting modes according to the present disclosure may further include a multi shooting mode in which one or more shooting modes are applied together.

When the shooting mode is determined, the electronic device 1000 according to the present disclosure may determine shooting parameters according to the determined shooting mode. The shooting parameters according to the present disclosure may include an adjustable aperture value, a sensitivity, a shutter speed value, etc., when the electronic device 1000 captures an image. According to an embodiment, the electronic device 1000 may determine a plurality of shooting modes for capturing the first image and determine shooting parameters according to the determined plurality of shooting modes.

In operation S740, the electronic device 1000 may determines a relative positional relationship between the at least one object and the background by using the pieces of feature information regarding the at least one object and the background, respectively, in the first image, and analyze a composition of the first image based on the determined relative positional relationship. According to another embodiment, the electronic device 1000 may analyze a composition of the first image by using the pieces of feature information regarding the at least one object and the background, respectively, in the first image and shooting parameters determined according to a shooting mode for the electronic device 1000. A composition of an image according to the present disclosure may include a golden ratio composition, a horizontal composition, a vertical composition, a tri-sectional composition, a vanishing point composition, etc., but is not limited thereto. A method, performed by the electronic device 1000, of applying a filter by using the analyzed composition of the first image will be described in detail with reference to FIG. 8.

In operation S760, the electronic device 1000 may determine information about a light source in the first image. For example, when a proportion of a background region occupying the first image is greater than or equal to a preset threshold, the electronic device 1000 may determine information about a light source in the first image based on values of pixels in the first image.

According to an embodiment, information about a light source may include information about a light source center and a light source boundary. For example, the electronic device 1000 may determine a pixel having a highest brightness value from among pixels in the first image by using values of the pixels in the first image and then determine coordinates of the pixel having the largest brightness value as a light source center. Furthermore, the electronic device 1000 may detect pixel sets having pixel values that are greater than or equal to a preset pixel value from among the pixels in the first image by using the values of the pixels in the first image and determine coordinates of pixels located at boundaries of the detected pixel sets as a light source boundary.

In operation S780, the electronic device 1000 may obtain additional information. The additional information obtained by the electronic device 1000 according to the present disclosure will be described in detail with reference to FIG. 11.

The electronic device 1000 according to the present disclosure may determine image filters to be applied to each of the at least one object and the background based on at least one of the determined shooting mode, the composition of the first image, the information about the light source in the first image, or the additional information. In other words, the electronic device 1000 may determine an image filter by using only shooting parameters determined according to the determined shooting mode, by using only the composition of the first image, by using only the information about the light source in the first image, or based on the obtained additional information. According to another embodiment, the electronic device 1000 may determine an image filter by using all of the shooting parameters determined according to the determined shooting mode, the composition of the first image, the information about the light source in the first image, and the additional information.

Figure 8:
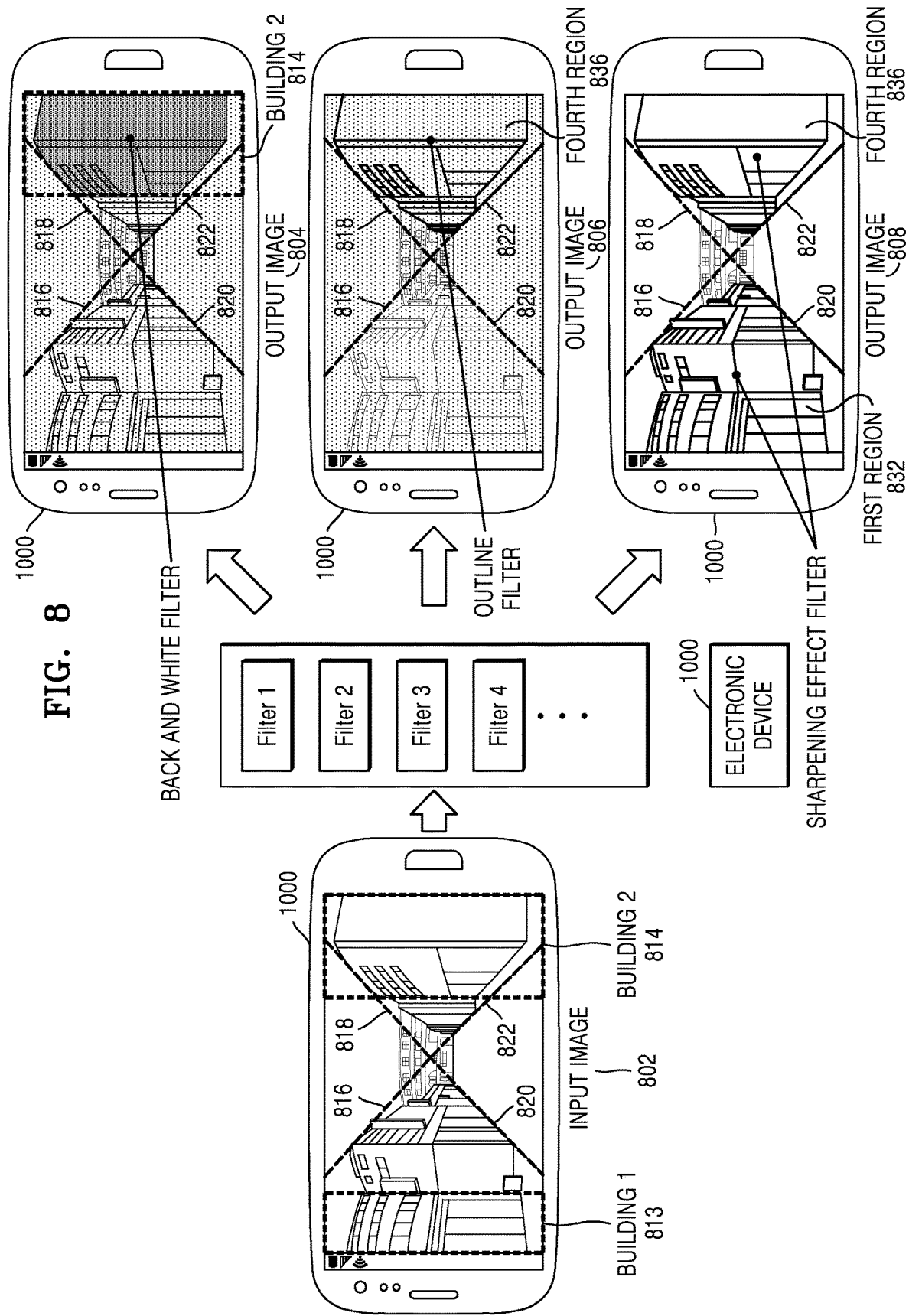
FIG. 8 is a diagram for explaining a method, performed by an electronic device, of applying a filter based on a composition of an image, according to an embodiment.

FIG. 8 is a diagram for explaining a method, performed by the electronic device 1000, of applying a filter based on a composition of an image, according to an embodiment.

As described above, the electronic device 1000 may apply an image filter to each of the detected at least one object. Referring to an output image 804 of FIG. 8, the electronic device 1000 may display a black-and-white effect in a region where building 2 814 detected in an input image 802 is located by applying a black and white filter to only the building 2 814. However, according to another embodiment, the electronic device 1000 may analyze a composition of a first image based on feature information and determine a filter to be applied to each of at least one object and background in the first image by using the analyzed composition of the first image.

For example, the electronic device 1000 may obtain, from the input image 802, pieces of feature information regarding building 1 813, building 2 814, and the background, respectively. The electronic device 1000 may generate a plurality of reference lines (e.g., vanishing lines) 816, 818, 820, and 822 for determining a composition of the input image 802 by using the pieces of feature information regarding the detected building 1 813, building 2 814, and background, respectively, and generate a plurality of regions 832 and 836 by segmenting the input image 802 based on the generated plurality of reference lines 816, 818, 820, and 822. Reference lines according to the present disclosure may converge to at least one vanishing point in the first image.

Referring to an output image 806, the electronic device 1000 according to the present disclosure may generate a plurality of regions by segmenting the input image 802 based on a plurality of reference lines 816, 818, 820, and 822 and apply an outline filter to only a fourth region 836 among the generated plurality of regions. Referring to an output image 808, which is obtained according another embodiment, the electronic device 1000 may generate a plurality of regions, i.e., first and second regions 832 and 836, by segmenting the input image 802 based on a plurality of reference lines 816, 818, 820, and 822 and apply, to the first and second regions 832 and 836, a sharpening effect filter for sharpening a shape of images included in the first and second regions 832 and 836.

Figure 9:
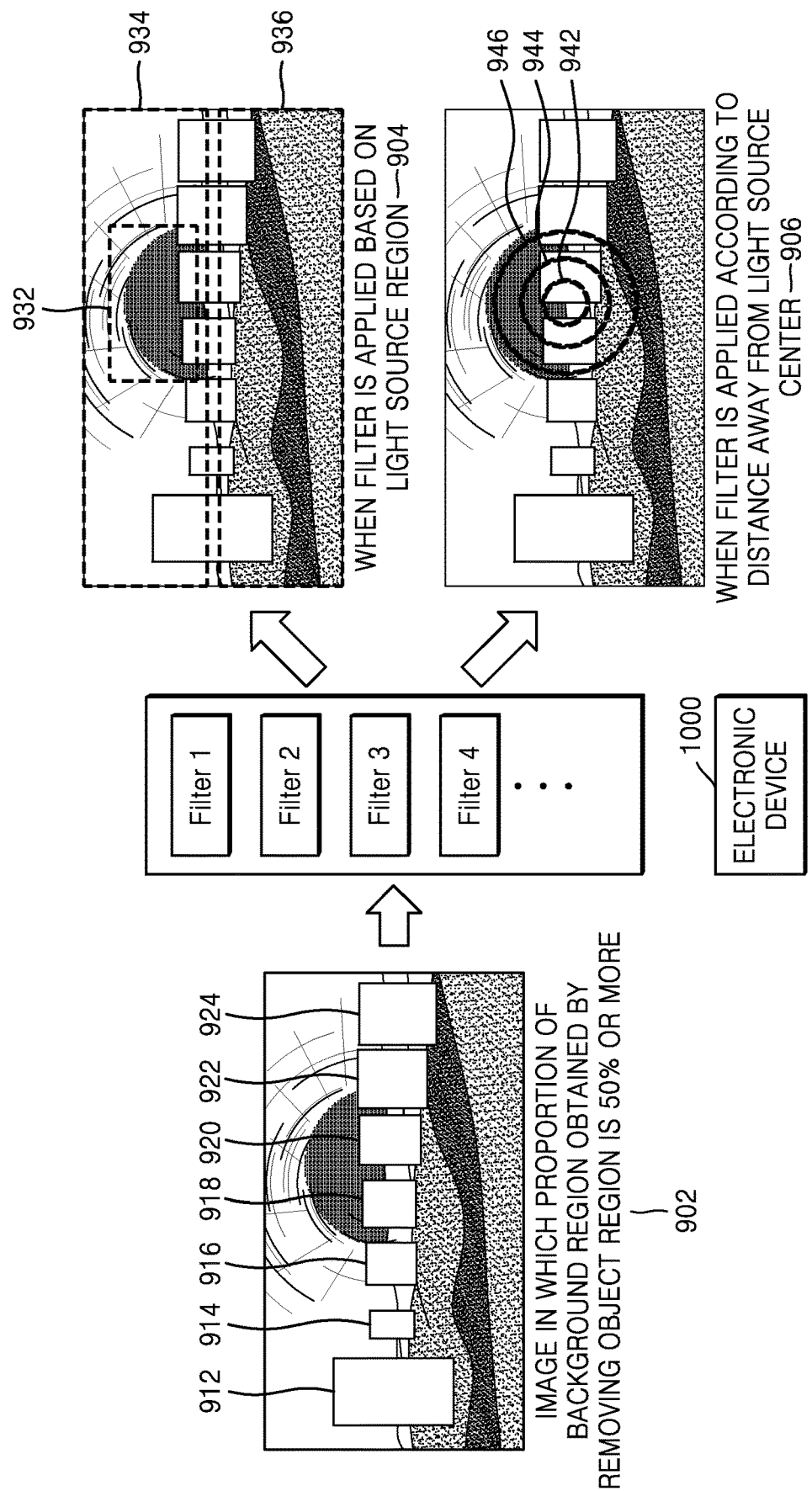
FIG. 9 is a diagram for explaining a method, performed by an electronic device, of applying a filter by using information about a light source in an image, according to an embodiment.

FIG. 9 is a diagram for explaining a method, performed by the electronic device 1000, of applying a filter by using information about a light source in an image, according to an embodiment.

According to an embodiment, the electronic device 1000 may determine information about a light source in a first image and determine an image filter to be applied to the first image by using the determined information about the light source in the first image. For example, the electronic device 1000 may detect a background region 902 in the first image and determine a proportion of the detected background region 902 occupying the first image. For example, when the proportion of the background region in the obtained first image is greater than or equal to a preset threshold (e.g., greater than or equal to 50%), the electronic device 1000 may determine information about a light source in the first image based on values of pixels in the first image.

According to an embodiment, information about a light source may include information about a light source center and a light source boundary. The electronic device 1000 may determine a pixel having a highest brightness value from among pixels in the first image by using values of pixels in the first image and then determine coordinates of the pixel having the highest brightness value as a light source center. Furthermore, the electronic device 1000 may detect pixel sets having pixel values that are greater than or equal to a preset pixel value from among the pixels in the first image by using the values of the pixels in the first image and determine coordinates of pixels located at boundaries of the detected pixel sets as a light source boundary.

According to an embodiment, the electronic device 1000 may determine a light source region by using the determined light source center and light source boundary. The electronic device 1000 may generate a second image by applying an image filter to a light source region determined based on the information about the light source. For example, the electronic device 1000 may apply a different image filter based on the light source region determined based on information about the light source or apply a different image filter according to a distance away from the light source center.

More specifically, the electronic device 1000 may determine a light source region 932 having a rectangular shape in the background region detected in the first image, an upper region 934 including the light source region 932 in the background region, and a lower region 936 not including the light source region 932 in the background region and then apply a different image filter for each determined region. According to an embodiment, the electronic device 1000 may apply, to the light source region 932 and the upper region 934, an image filter for decreasing brightness values of pixels included in the light source region 932 and the upper region 934, while applying, to the lower region 936 mainly including pixels having a relatively low brightness value due to the absence of the light source, an image filter for increasing brightness values of pixels included in the lower region 936.

According to another embodiment, the electronic device 1000 may apply, to the background region, a filter exhibiting a different image effect according to a distance away from the light source center. For example, the electronic device 1000 may apply an image filter for decreasing a pixel brightness value by 3 to a light source region 942 with a smallest radius and a light source center at the origin, while applying an image filter for decreasing a brightness value by 1 to a light source region 946 with a largest radius and the light source center at the origin.

Figure 10:
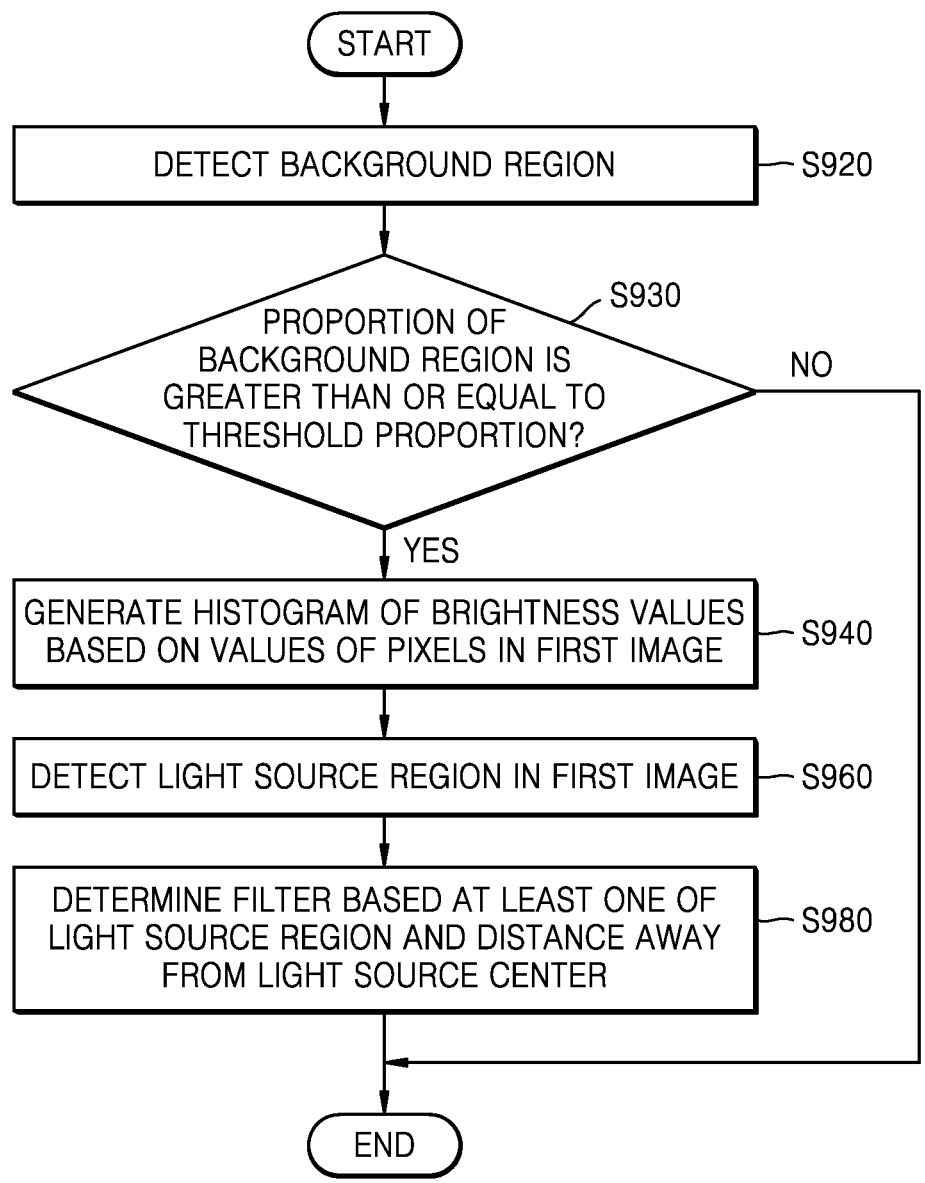
FIG. 10 is a flowchart of a method, performed by an electronic device, of determining a filter by using information about a light source in an image, according to an embodiment.

FIG. 10 is a flowchart of a method, performed by the electronic device 1000, of determining a filter by using information about a light source in an image, according to an embodiment.

In operation S920, the electronic device 1000 may detect a background region in an obtained first image. Since operation S920 may correspond to operation S240 of FIG. 2, a detailed description thereof will be omitted here.

In operation S930, the electronic device 1000 may determine whether a proportion of the detected background region occupying the first image is greater than or equal to a threshold value. For example, the electronic device 1000 may determine whether a proportion of the detected background region occupying the first image is greater than or equal to a threshold value by using a ratio of the number of pixels included in the background region to the total number of pixels included in the first image. According to an embodiment, when the proportion of the background region occupying the first image is 50% or more, the electronic device 1000 may determine information about a light source in the first image based on values of pixels in the first image.

In operation S940, when the proportion of the background region occupying the first image is greater than or equal to the threshold value, the electronic device 1000 may generate a histogram of a brightness value based on values of pixels in the first image.

In operation S960, the electronic device 1000 may detect a light source region in the first image by using the generated histogram. For example, the electronic device 1000 may generate a histogram of a brightness value for each pixel coordinate by using values of pixels in the first image and determine a light source center and a light source boundary by using the brightness value shown on the generated histogram. The electronic device 1000 may determine a light source region in the first image by using the determined light source center and light source boundary.

In operation S980, the electronic device 1000 may determine an image filter exhibiting a different image effect based on at least one of the determined light source region and a distance away from the light source center. Since operation S980 may correspond to the operation of the electronic device 1000 of FIG. 9, a detailed description thereof will be omitted here.

FIG. 11 is a diagram illustrating examples of pieces of additional information used by the electronic device 1000, according to an embodiment.

According to an embodiment, the electronic device 1000 may obtain additional information related to a first image in addition to obtaining the first image and determine image filters to be applied to each of at least one object and background in the first image by further using the obtained additional information. The additional information obtained by the electronic device 1000 according to the present disclosure includes at least one of information 1021 about a time when the first image was captured, information 1022 about a place where the first image was captured, information 1024 about weather of the place where the first image was captured at the time when the first image was captured, information 1023 about a direction of the electronic device 1000 that captured the first image, information 1025 indicating whether the place where the first image was captured is inside or outside a building, operation control information regarding the electronic device 1000 (e.g., a camera option 1026), information 1027 about a favorite filter used by a user of the electronic device 1000, and a history of filter modification by the user of the electronic device 1000.

According to an embodiment, pieces of additional information obtained by the electronic device 1000 may be prestored in a memory of the electronic device 1000 in the form of a table. In addition, the pieces of additional information obtained by the electronic device 1000 may be obtained in the form of metadata attached to the first image. According to an embodiment, the information 1021 about the time when the first image was captured may be obtained using a time stamp appended to the first image. The Information 1023 about the direction of the electronic device 1000 that captured the first image according to the present disclosure may indicate which of the front and rear cameras included in the electronic device 1000 was used to capture the obtained first image. In addition, the information 1027 about a favorite filter used by the user of the electronic device 1000 may indicate a favorite filter mainly used by the user of the electronic device 1000 for each of an object and a background.

Furthermore, the operation control information regarding the electronic device 1000 according to the present disclosure may indicate whether the electronic device 1000 is to apply the determined image filter to the first image automatically or manually. For example, when the operation control information regarding the electronic device 1000 indicates automatic (AO), the electronic device 1000 may automatically apply the determined image filters to each of the at least one object and the background included in the obtained first image. However, when the operation control information regarding the electronic device 1000 indicates manual (MO), the electronic device 1000 may provide candidate image filters that are to be applied to the at least one object and the background included in the first image and manually apply image filters based on a user input for selecting at least one of the provided candidate image filters.

Figure 12:
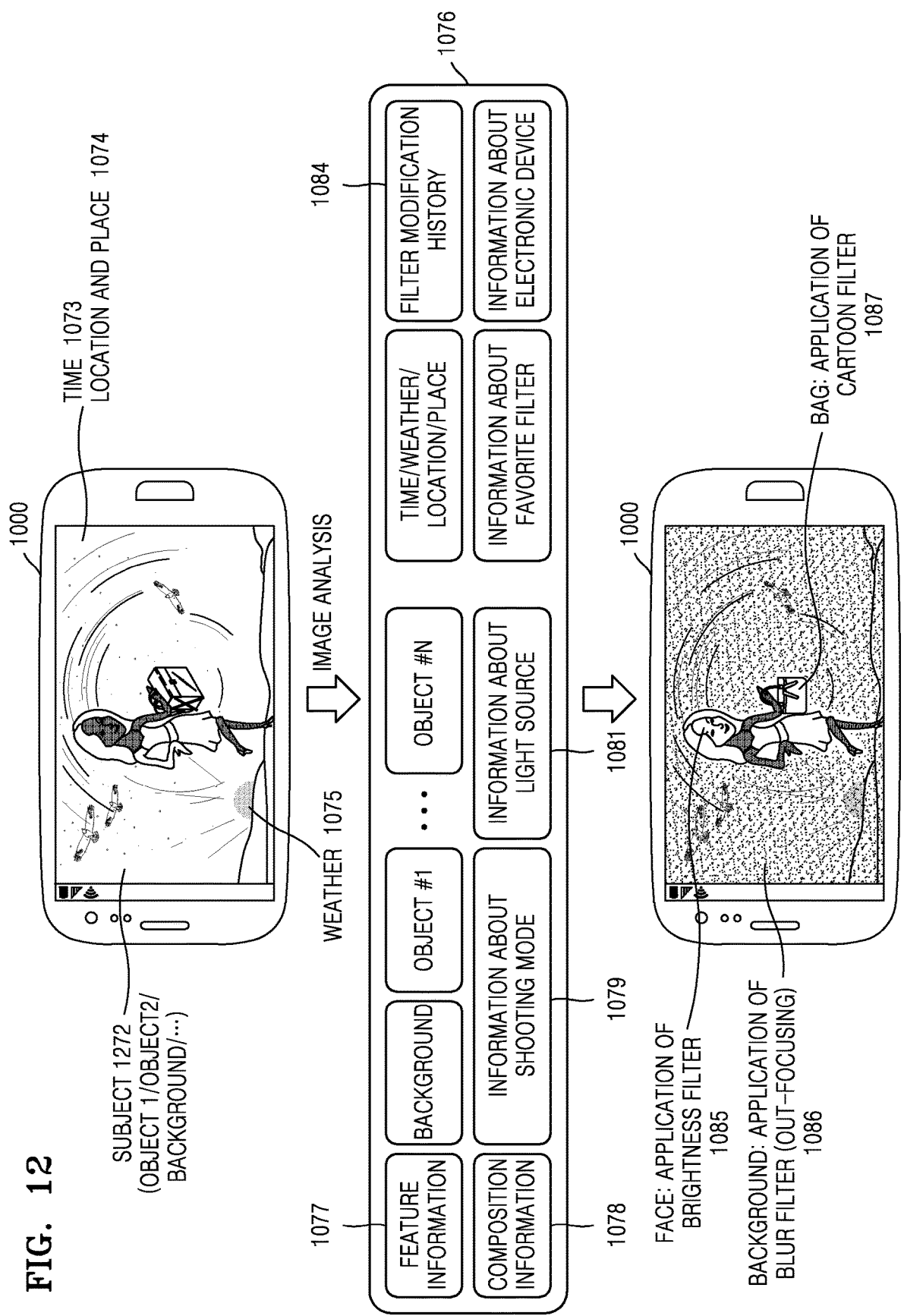
FIG. 12 is a diagram for explaining a method, performed by an electronic device, of applying a filter by using pieces of additional information, according to an embodiment.

FIG. 12 is a diagram for explaining a method, performed by the electronic device 1000, of applying a filter by using pieces of additional information, according to an embodiment.

According to an embodiment, the electronic device 1000 may obtain a first image and pieces of additional information related to the first image and apply image filters to each of at least one object and background in the first image by using the obtained pieces of additional information. Pieces of additional information according to the present disclosure may be combined with the first image in the form of metadata. For example, information about a subject including an object and a background, a time 1073 when the first image was captured, a location and a place 1074 where the first image was captured, and information about weather 1075 of the place 1074 where the first image was captured at the time when the first image was captured may be combined with the first image obtained by the electronic device 1000.

The electronic device 1000 according to the present disclosure may detect the at least one object and the background in the first image by using a pre-trained neural network stored in the electronic device 1000 and obtain, based on pieces of feature information 1077 regarding the detected object and background, respectively, composition information 1078 regarding a composition of the first image, information 1079 about a shooting mode of the electronic device 1000 for capturing the first image, and information 1081 about a light source in the first image.

Furthermore, the electronic device 1000 according to the present disclosure may further obtain pieces of additional information including a user's filter modification history 1084, and generate a second image by applying image filters to be applied to each of an object and a background in the first image by using at least one of the obtained pieces of additional information including the user's filter modification history 1084, the pieces of feature information 1077, the composition information 1078, the information 1079 about a shooting mode, and the information 1081 about the light source. For example, the electronic device 1000 may generate a second image by applying a brightness filter 1085 to a person's face in the first image, a cartoon filter 1087 to a bag therein, and a blur filter (out-focusing) to the background therein.

Figure 13:
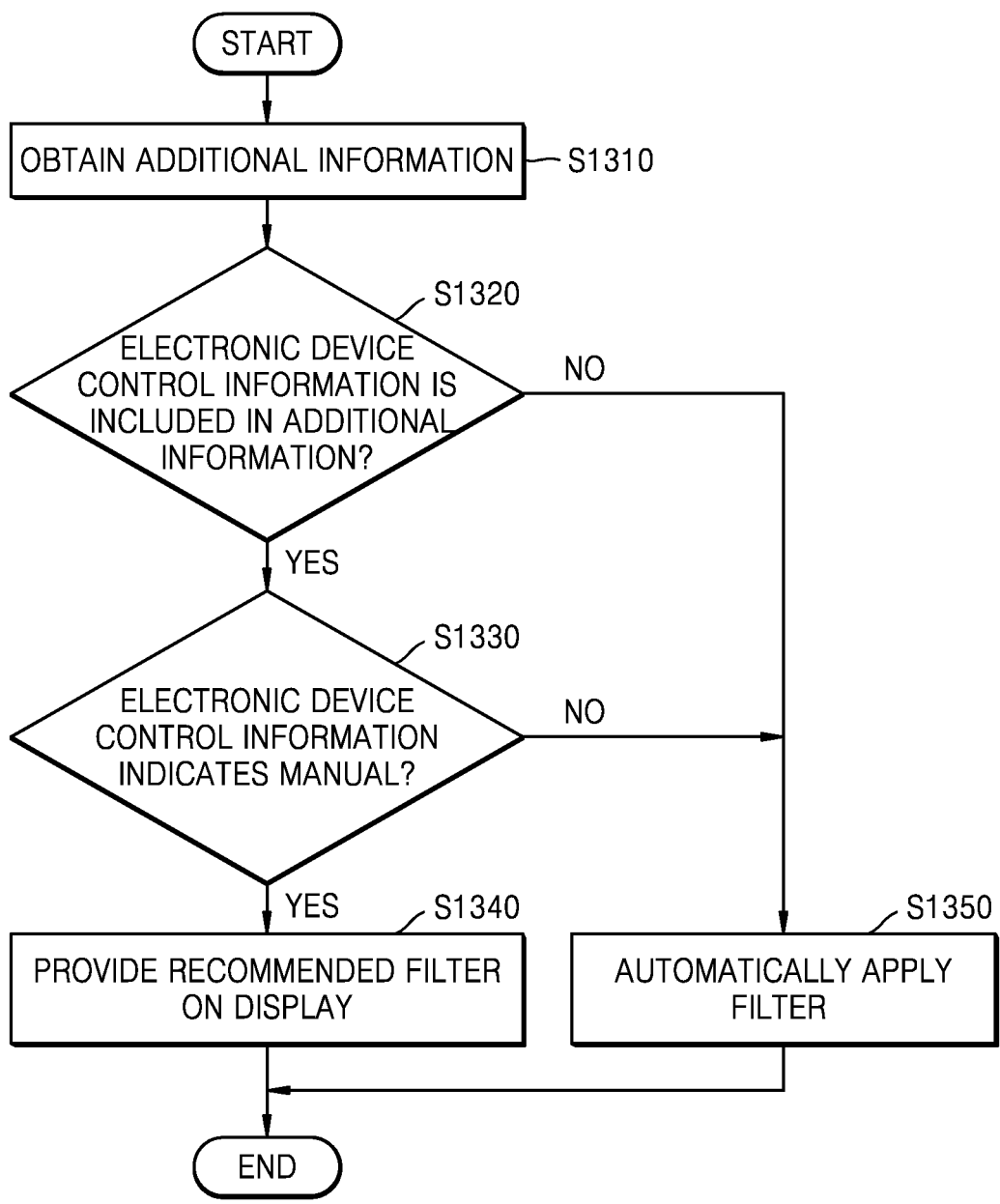
FIG. 13 is a diagram for explaining a method, performed by an electronic device, of using additional information to control operation of the electronic device, according to an embodiment.

FIG. 13 is a diagram for explaining a method, performed by the electronic device 1000, of using additional information for controlling an operation of the electronic device, according to an embodiment.

In operation S1310, the electronic device 1000 may obtain pieces of additional information about the first image. Since the pieces of additional information obtained by the electronic device 1000 in operation S1310 may correspond to the pieces of information included in an additional information table of FIG. 11, detailed descriptions thereof will be omitted here.

In operation S1320, the electronic device 1000 may determine whether electronic device control information is included in the obtained pieces of additional information. Since the electronic device control information obtained by the electronic device 1000 in operation S1320 may correspond to the electronic device control information (the camera option 1026) included in the additional information table of FIG. 11, a detailed description thereof will be omitted here.

In operation S1330, when the electronic device control information is included in the obtained pieces of additional information, the electronic device 1000 may determine whether the electronic device control information indicates manual. In operation S1340, when the electronic device control information included in the pieces of additional information indicates manual (MO), the electronic device 1000 may provide, on a display, candidate image filters to be applied to each of at least one object and background in the first image. The electronic device 1000 may generate a second image by applying an image filter to each of the at least one object and the background in the first image based on a user input for selecting candidate image filters provided on the display.

In operation S1350, when the electronic device control information included in the pieces of additional information indicates automatic (AO), the electronic device 1000 may automatically apply an image filter to each of the at least one object and the background in the first image. In other words, when the electronic device control information included in the pieces of additional information indicates automatic (AO), the electronic device 1000 may generate the second image without an additional user input by automatically applying an image filter to each of the at least one object and the background in the first image.

Figure 14:
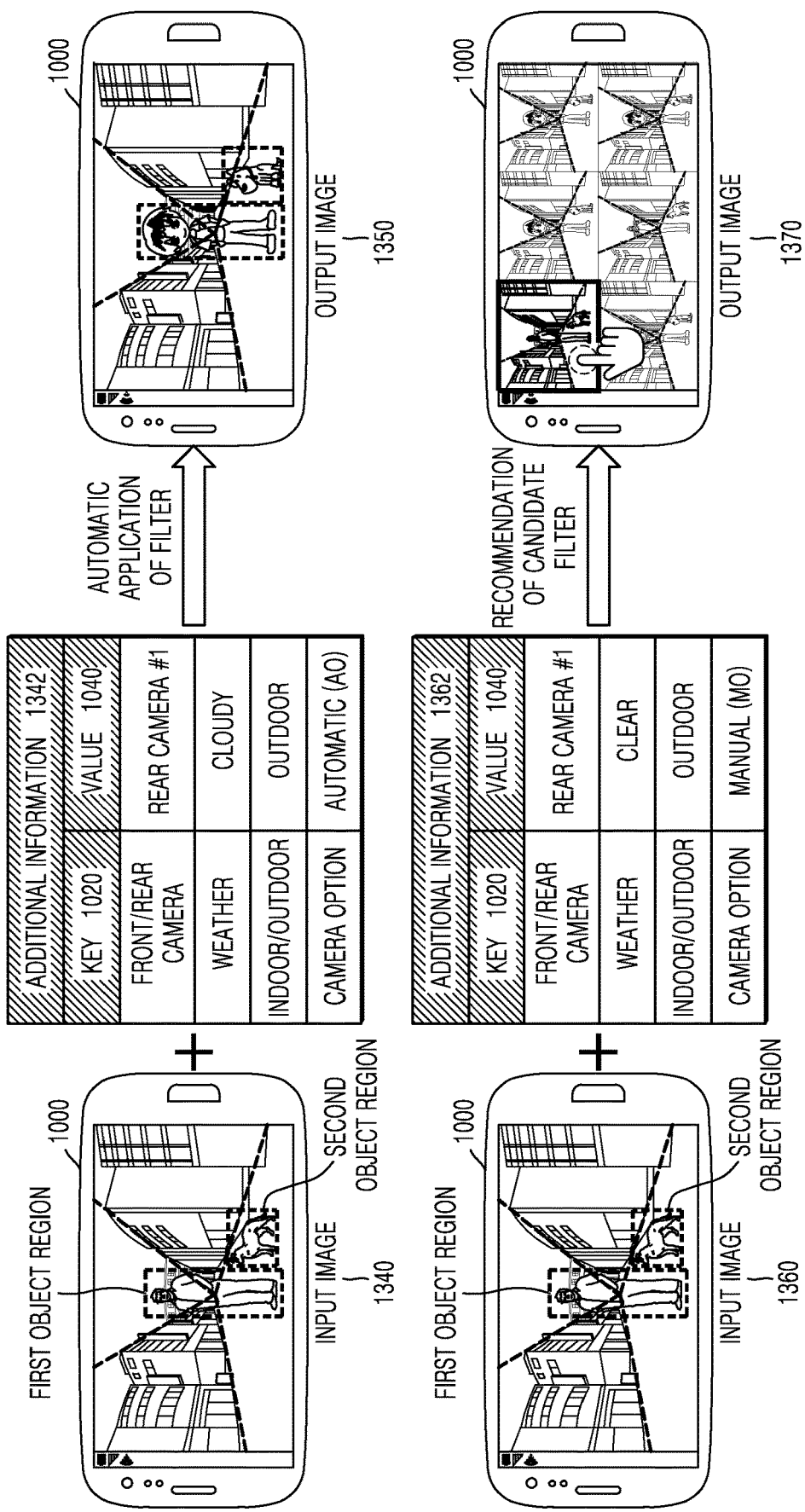
FIG. 14 is a diagram for explaining a method, performed by an electronic device, of manually or automatically applying a filter by using additional information, according to an embodiment.

FIG. 14 is a diagram for explaining a method, performed by the electronic device 1000, of manually or automatically applying a filter by using additional information, according to an embodiment.

According to an embodiment, the electronic device 1000 may obtain an input image 1340 and additional information 1342 in which a camera option is set to automatic (AO). When the camera option included in the additional information 1342 is set to automatic (AO), the electronic device 1000 according to the present disclosure may generate an output image 1350 by automatically applying an image filter exhibiting a different image effect to each of at least one object and background included in the input image 1340.

According to another embodiment, the electronic device 1000 may obtain an input image 1360 and additional information 1362 in which a camera option is set to manual (MO). When the camera option included in the additional information 1362 is set to manual (MO), the electronic device 1000 according to the present disclosure may provide, on a display of the electronic device 1000, candidate image filters respectively exhibiting different image effects on at least one object and background included in the input image 1360, and generate an output image 1370 by manually applying image filters to each of the at least one object and the background included in the first image based on a user input for selecting at least one of the candidate image filters provided on the display.

Figure 15:
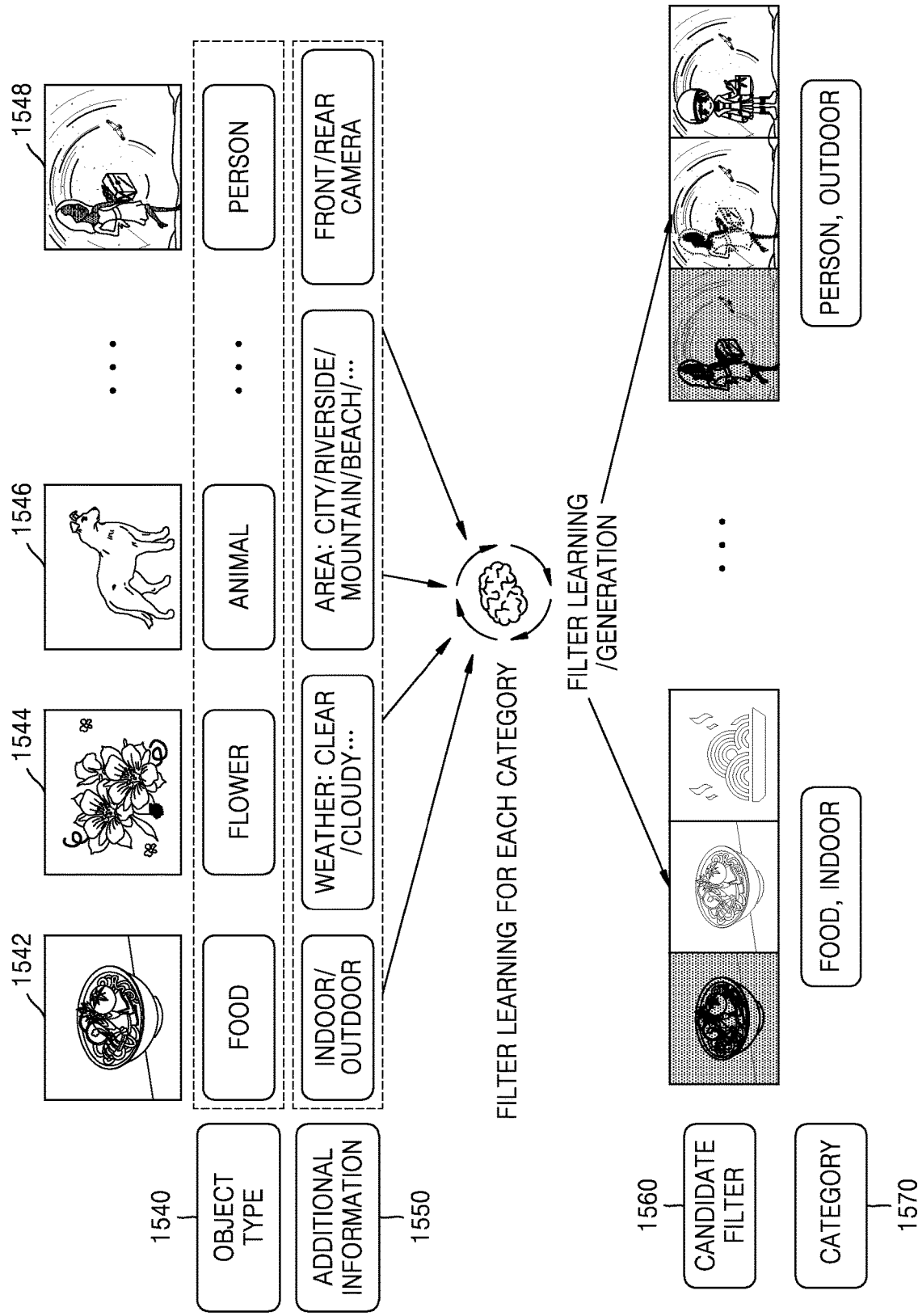
FIG. 15 is a diagram for explaining a method, performed by an electronic device, of determining a filter, according to another embodiment.

FIG. 15 is a diagram for explaining a method, performed by the electronic device 1000, of determining a filter, according to another embodiment.

The electronic device 1000 according to the present disclosure may provide, on a display, a candidate image filter to be applied to each of at least one object and background in an obtained first image by using at least one neural network model. For example, when feature information including information 1540 about types of an object and a background included in the obtained first image and pieces of location information regarding the object and the background, respectively, in the first image are input to a neural network, the electronic device 1000 may pre-train a neural network model that outputs at least one filter and provide at least one candidate image filter by using the pre-trained neural network model.

According to an embodiment, the electronic device 1000 may further obtain additional information 1550 related to the first image in addition to the first image, and when pieces of feature information regarding at least one object and a background, respectively, in the obtained first image and the additional information 1550 are input, pre-train a neural network model that outputs an image filter to be applied to each of the at least one object and the background in the first image and provide at least one candidate image filter by using the pre-trained neural network model. That is, the electronic device 1000 according to the present disclosure may generate a plurality of categories 1570 that are to be distinguished according to at least one of information about types of an object and a background included in the first image, pieces of location information regarding the object and the background, respectively, and the additional information 1550, and provide different candidate image filters for each of the plurality of categories 1570 by using a neural network model pre-trained for each category.

Figure 16:
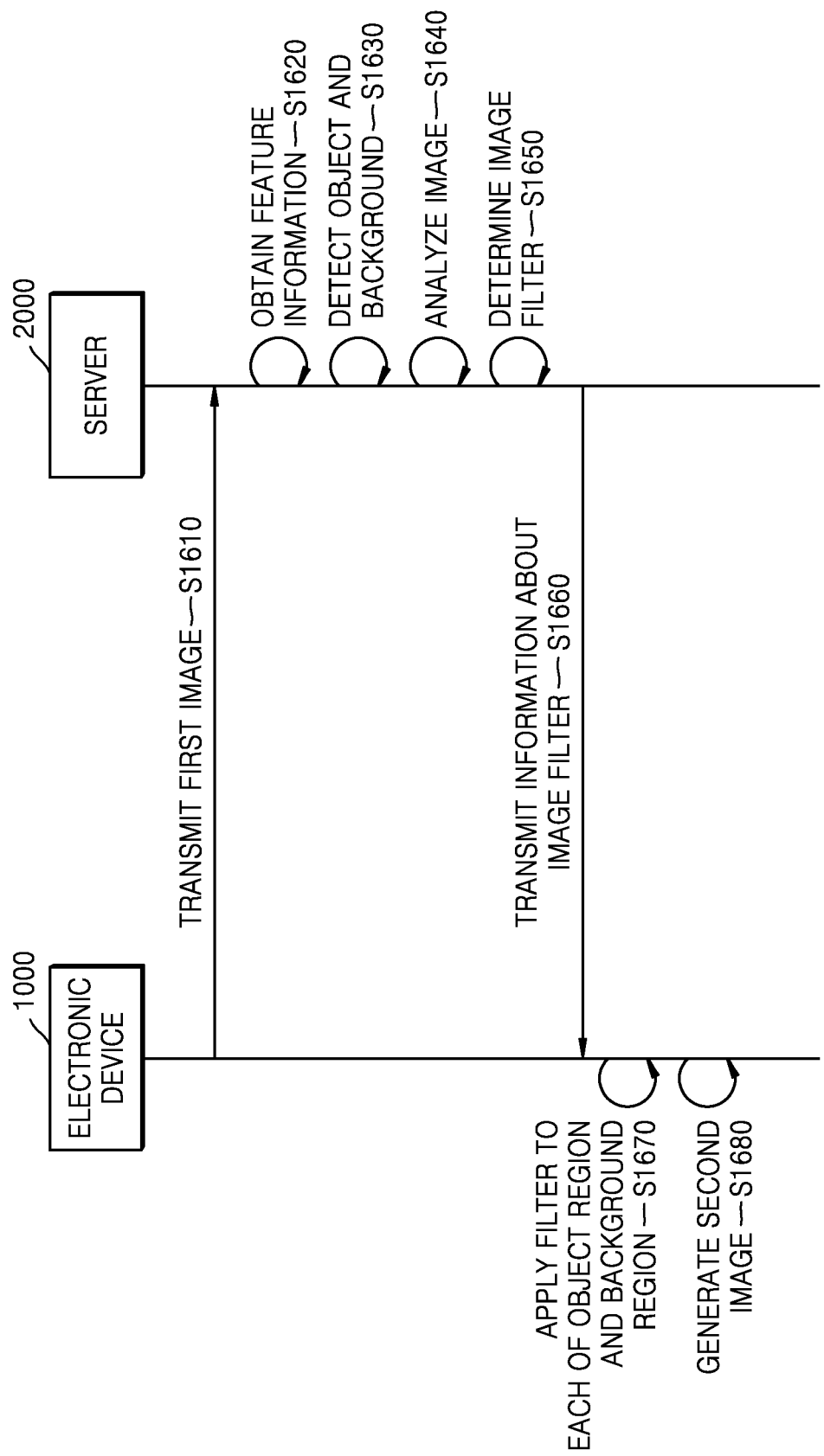
FIG. 16 is a diagram for explaining a method of generating a second image by using a server, according to an embodiment.

FIG. 16 is a diagram for explaining a method of generating a second image by using a server, according to an embodiment.

Referring to FIG. 16, the electronic device 1000 may determine image filters to be applied to each of at least one object and background in a first image by using a neural network embedded in a server 2000 connected to the electronic device 1000 by wire or wirelessly.

For example, in operation S1610, the electronic device 1000 may transmit the obtained first image to the server 2000. That is, when the first image is obtained, the electronic device 1000 may establish a communication link with the server 2000 including a first or second neural network and transmit the first image to the server 2000 via the established communication link.

In operation S1620, when the first image is input, the server 2000 may obtain pieces of feature information regarding the at least one object and the background, respectively, in the first image by using the first neural network that outputs feature information for identifying an object region including an image of a portion corresponding to the at least one object and a background region including an image of a portion corresponding to the background. In operation S1630, the server 2000 may detect the at least one object and the background in the first image based on the obtained pieces of feature information.

In operation S1640, the server 2000 may analyze the obtained first image based on the pieces of feature information regarding the detected at least one object and background, respectively. For example, when the pieces of feature information are input, the server 2000 according to the present disclosure may analyze the first image transmitted from the electronic device 1000 by using a second neural network that outputs image filters to be applied to the first image. An operation of the server 200 according to the present disclosure analyzing the first image may further include an operation of analyzing a composition of the first image, an operation of determining information about a light source in the first image, and an operation of determining a shooting mode of the electronic device 1000 for capturing the first image.

In operation S1650, the server 2000 may determine image filters exhibiting different image effects, which are to be applied to each of the at least one object and the background in the first image, based on a result of the analysis of the first image. In operation S1660, the server 2000 may transmit information about the determined image filters to the electronic device 1000.

In operation S1670, the electronic device 1000 may apply the image filters exhibiting different image effects to each of the at least one object and the background in the first image by using the information about the image filters received from the server 2000. In operation S1680, the electronic device 1000 may generate a second image by applying the image filters exhibiting different image effects to each of the at least one object and the background in the first image.

Figure 17:
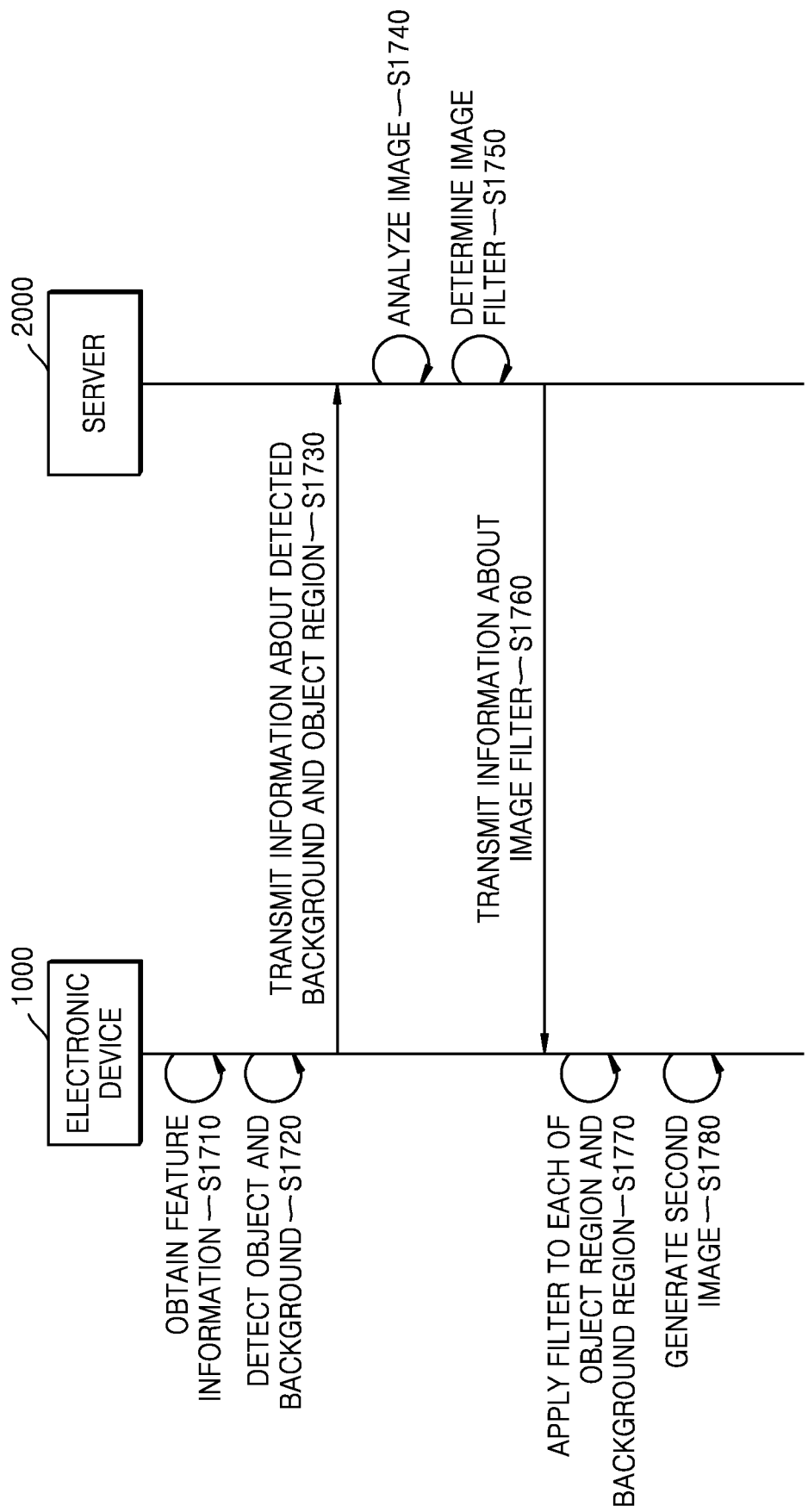
FIG. 17 is a diagram for explaining a method of generating a second image by using a server, according to another embodiment.

FIG. 17 is a diagram for explaining a method of generating a second image by using a server, according to another embodiment.

Referring to FIG. 17, the electronic device 1000 may obtain pieces of feature information regarding at least one object and a background, respectively, in an obtained first image by using a first neural network embedded in the electronic device 1000 and determine image filters to be applied to each of the at least one object and the background in the first image by using a second neural network embedded in a server 2000 connected to the electronic device 1000 by wire or wirelessly.

In detail, in operation S1710, when the first image loaded into the electronic device 1000 is input, the electronic device 1000 may obtain pieces of feature information regarding the at least one object and the background, respectively, in the first image by using the first neural network that outputs feature information for identifying at least one object region and a background region. In operation S1720, the electronic device 1000 may detect the at least one object and the background in the first image based on the obtained pieces of feature information. In operation S1730, the electronic device 1000 may transmit information about the detected at least one object and background to the server 2000.

According to an embodiment, when pieces of feature information regarding the at least one object and the background, respectively, in the obtained first image are output from the first neural network, the electronic device 1000 may establish a communication link with the server 2000 including the second neural network and transmit, to the server 2000, information about the at least one object and the background detected based on the obtained pieces of feature information via the established communication link.

In operation S1740, when the pieces of feature information loaded into the server 2000 is input, the server 2000 according to the present disclosure may analyze the first image transmitted from the electronic device 1000 by using a second neural network that outputs image filters to be applied to the first image. An operation of the server 200 according to the present disclosure analyzing the first image may further include an operation of determining a shooting mode of the electronic device 1000 for capturing the first image, an operation of analyzing a composition of the first image, and an operation of determining information about a light source in the first image.

In operation S1750, the server 2000 may determine, based on a result of the analysis of the first image, image filters to be applied to each of the at least one object and the background in the first image. For example, the server 2000 may determine image filters to be applied to each of the at least one object and the background in the first image based on at least one of a determined shooting mode, a composition of the first image, and information about a light source included in the first image.

In operation S1760, the server 2000 may transmit information about the determined image filters to the electronic device 1000. In operation S1770, the electronic device 1000 may apply the image filters to be used for each of the at least one object and the background in the first image by using the information about the image filters received from the server 2000. In operation S1780, the electronic device 1000 may generate a second image by applying the image filters to each of the at least one object and the background in the first image.

Figure 18:
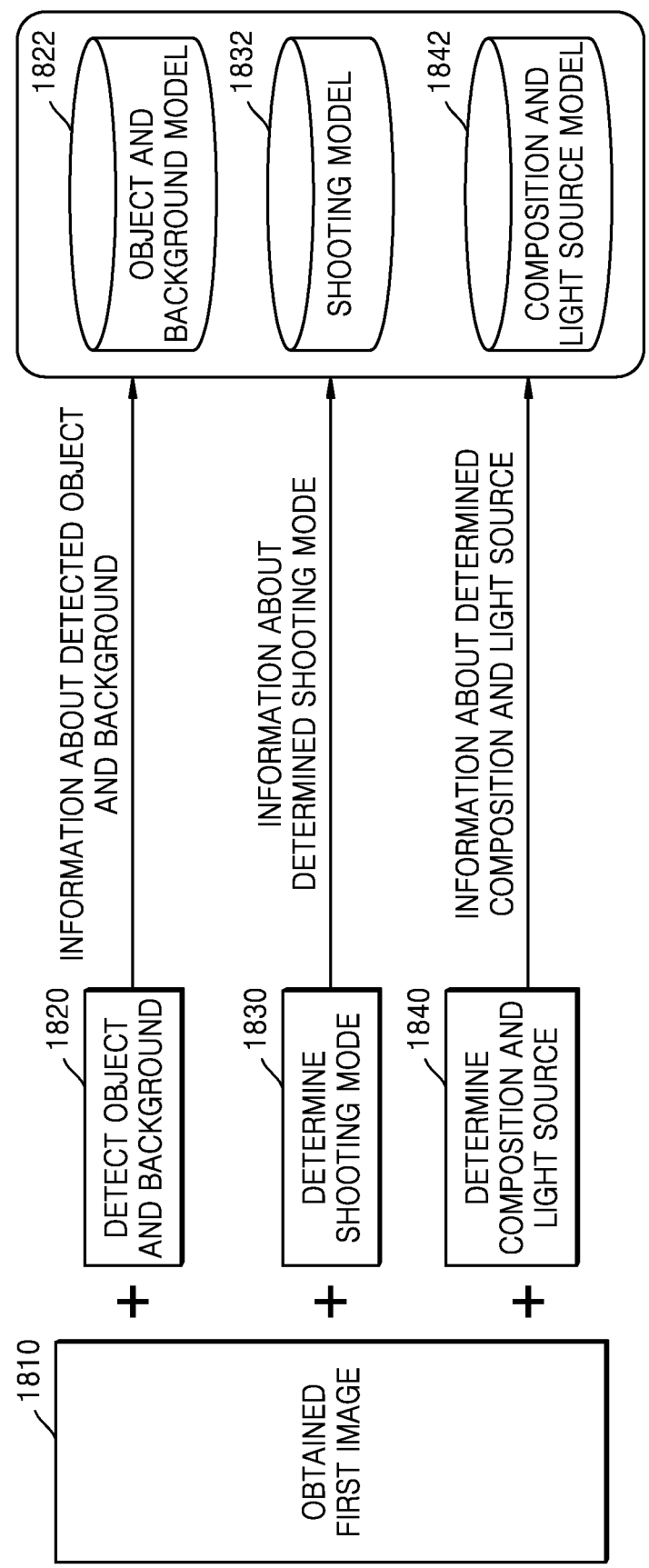
FIG. 18 is a diagram for explaining a method, performed by an electronic device, of analyzing an image by using a plurality of learning models, according to an embodiment.

FIG. 18 is a diagram for explaining a method, performed by the electronic device 1000, of analyzing an image by using a plurality of learning models, according to an embodiment.

When a first image 1810 is input, the electronic device 1000 according to the present disclosure may detect at least one object and a background in the first image 1810 by using a pre-trained first neural network that outputs pieces of feature information regarding the at least one object and the background, respectively, in the first image 1810. The first neural network used by the electronic device 1000 to detect an object and a background may be trained based on an object and background model 1822, and the object and background model 1822 may be updated (e.g., refined) based on information about the object and background detected in the first image 1810. That is, the electronic device 1000 according to the present disclosure may detect the at least one object and the background in the first image 1810 by using the first neural network and retrain the first neural network by refining weights for layers in the first neural network and a strength of connections between the layers via the object and background model 1822 updated based on information about the detected at least one object and background.

According to an embodiment, by using a second neural network that takes, as an input, pieces of feature information regarding the at least one object and the background, respectively, in the first image 1810, the electronic device 1000 may determine its shooting mode for capturing the first image 1810 and then image filters to be applied to the first image 1810 based on shooting parameters determined according to the determined shooting mode. The second neural network used by the electronic device 1000 to determine a shooting mode may be trained based on a shooting model 1832, and the shooting model 1832 may be updated (e.g., refined) based on information about the shooting mode determined for the obtained first image 1810. That is, the electronic device 1000 according to the present disclosure may determine a shooting mode for capturing the first image 1810 by using the second neural network and retrain the second neural network by refining weights for layers in the second neural network and a strength of connections between the layers by using the shooting model 1832 updated based on information about the determined shooting mode.

According to another embodiment, the electronic device 1000 may determine a composition of the first image 1810 and information about a light source in the first image 1810 by using the second neural network that takes, as an input, pieces of feature information regarding the at least one object and the background, respectively, in the first image 1810. The second neural network used by the electronic device 1000 to determine a composition of the first image 1810 and information about a light source in the first image 1810 may be trained based on a composition and light source model 1842, and the composition and light source model 1842 may be updated (e.g., refined) based on the composition determined for the first image 1810 and the information about the light source. That is, the electronic device 1000 according to the present disclosure may determine a composition of the first image 1810 and information about a light source in the first image 1810 by using the second neural network and retrain the second neural network by refining weights for layers in the second neural network and a strength of connections between the layers by using the composition and light source model 1842 updated based on the determined composition of the first image 1810 and information about the light source in the first image 1810.

Figure 19:
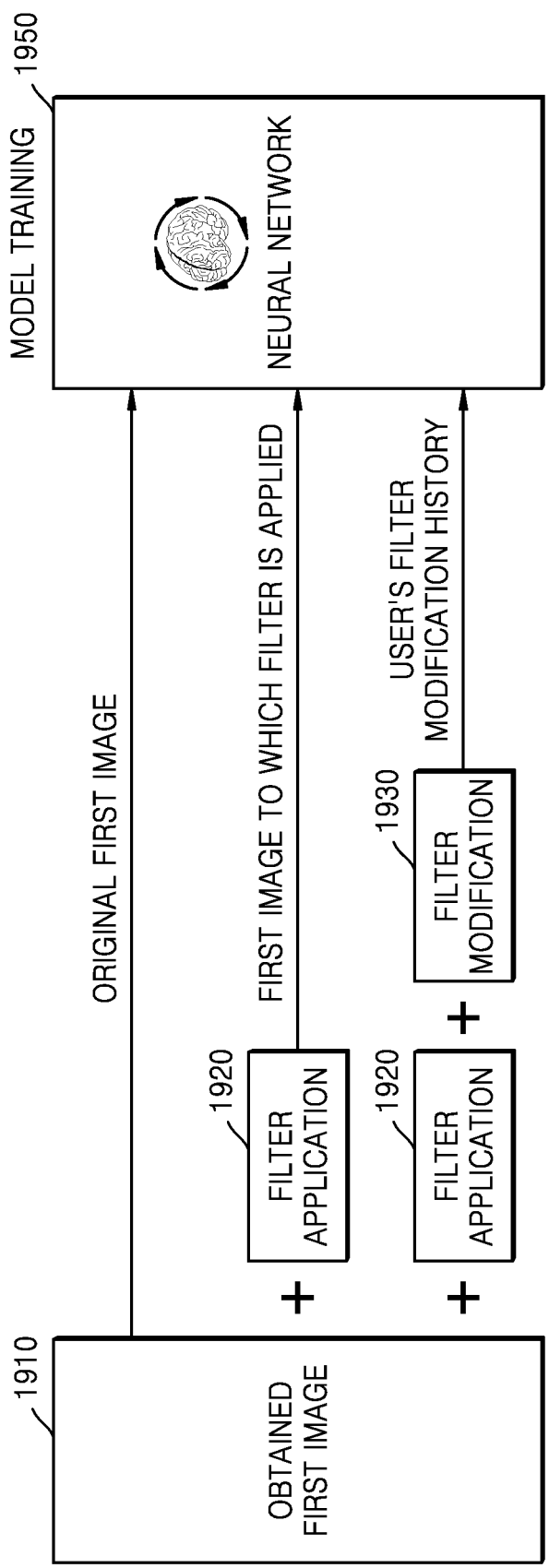
FIG. 19 is a diagram for explaining training data for a neural network used by an electronic device, according to an embodiment.

FIG. 19 is a diagram for explaining training data for a neural network used by the electronic device 1000, according to an embodiment.

A neural network model used by the electronic device 1000 according to the present disclosure may be trained based on an original first image 1910 obtained by the electronic device 1000. However, the electronic device 1000 according to the present disclosure may train the neural network model based on a first image 1920 to which an image filter has already been applied in order to provide image filters more suitable for an intention of a user. Moreover, since the neural network model used by the electronic device 1000 according to the present disclosure may be trained based on a first image 1930 obtained by modifying the applied image filter, the electronic device 1000 may provide a candidate image filter that better reflects an intention of a user to modify candidate image filters provided by the neural network model.

Figure 20:
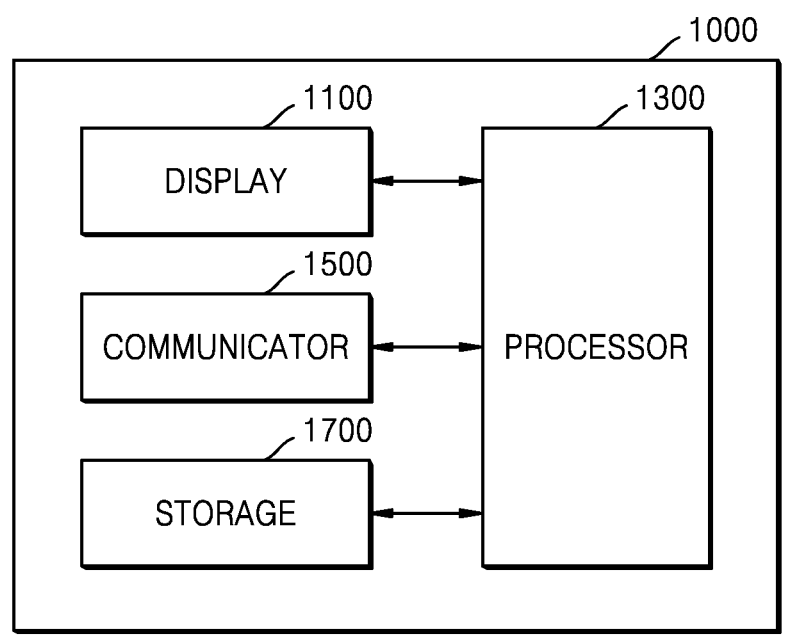
FIG. 20 is a block diagram illustrating an electronic device according to an embodiment.
Figure 21:
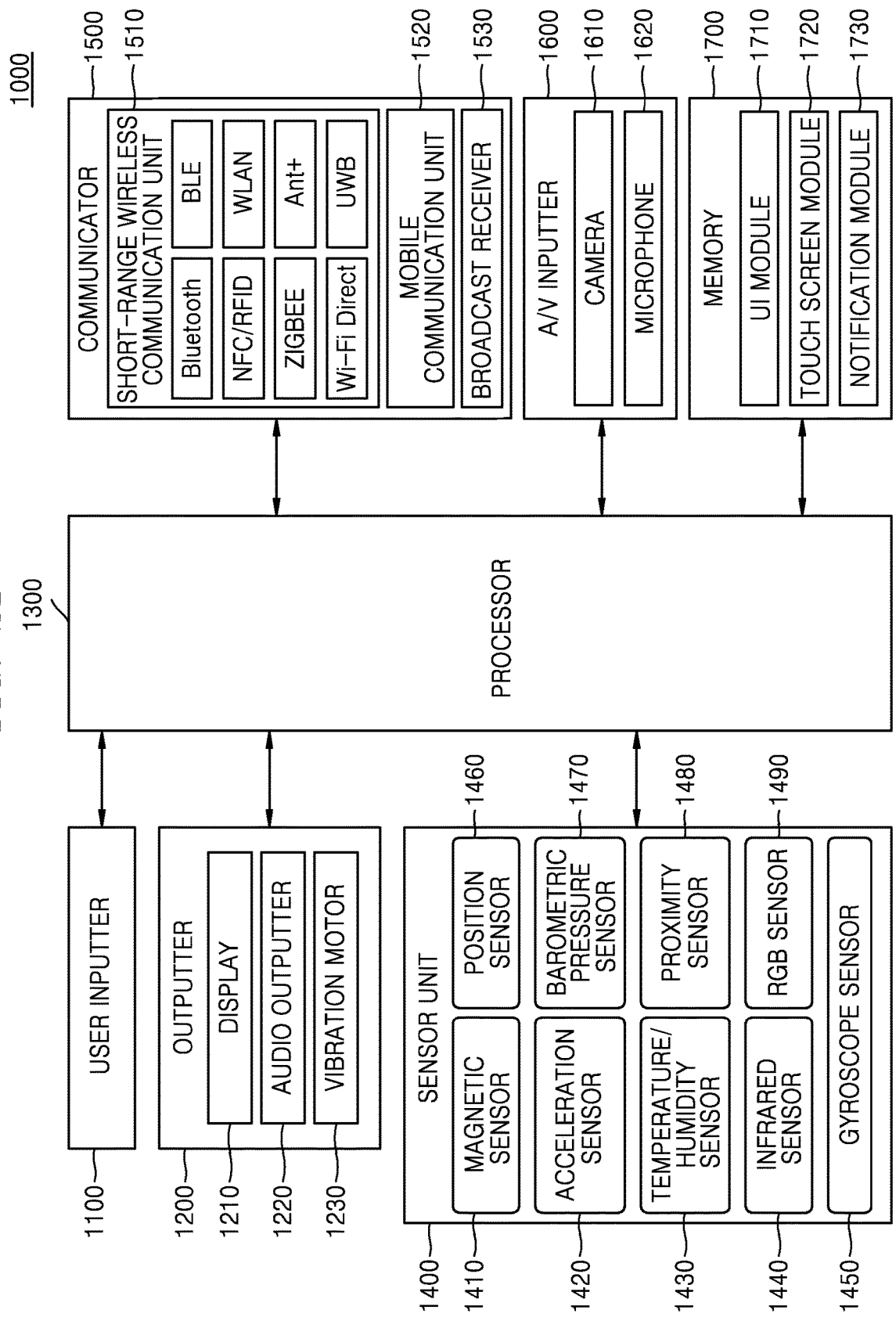
FIG. 21 is a block diagram illustrating an electronic device according to an embodiment.

FIGS. 20 and 21 are block diagrams illustrating an electronic device 1000 according to an embodiment.

Referring to FIG. 20, according to an embodiment, the electronic device 1000 may include a display 1100, a processor 1300, a communicator 130, and a storage 1700. All components shown in FIG. 20 are not essential components of the electronic device 1000. The electronic device 1000 may be implemented with more or fewer components than those shown in FIG. 20.

For example, as shown in FIG. 21, according to an embodiment, the electronic device 1000 may further include a sensor unit 1400, an audio/video (AV) inputter 1600, and a memory 1700 in addition to a user inputter 1100, an outputter 1200, a processor 1300, and a communicator 1500.

The user inputter 1100 refers to a means via which a user inputs data for controlling the electronic device 1000. Examples of the user inputter 1100 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, and a jog switch.

The user inputter 1100 may receive a user input for selecting at least one candidate image filter from among candidate image filters provided on a display and to be applied to the first image.

The outputter 1200 may output an audio signal, a video signal, or a vibration signal, and include a display 1210, an audio outputter 1220, and a vibration motor 1230.

The display 1210 includes a screen for displaying and outputting information processed by the electronic device 1000. In addition, the screen may display an image. For example, at least a portion of the screen may display at least a portion of a first image and a second image obtained by applying at least one image filter to the first image.

The audio outputter 1220 may output audio data received from the communicator 1500 or stored in the memory 1700. The audio outputter 1220 may also output sound signals associated with functions performed by the electronic device 1000 (e.g., a call signal reception sound, a message reception sound, and a notification sound).

The processor 1300 generally controls all operations of the electronic device 1000. For example, the processor 1300 may control all operations of the user inputter 1100, the outputter 1200, the sensor unit 1400, the communicator 1500, and the A/V inputter 1600 by executing programs stored in the memory 1700. Furthermore, the processor 1300 may perform functions of the electronic device 1000 described with reference to FIGS. 1 through 20 by executing programs stored in the memory 1700.

The processor 1300 may be configured as one or a plurality of processors, and the one or plurality of processors may be a general-purpose processor such as a central processing unit (CPU), an application processor (AP), or a digital signal processor (DSP), a graphics processor such as a graphics processing unit (GPU) or a vision processing unit (VPU), or an AI processor such as a neural processing unit (NPU). According to an embodiment, when the processor 1300 includes a general-purpose processor, an AI processor, and a graphics processor, the AI processor may be implemented as a chip separate from the general-purpose processor or the graphics processor.

For example, the processor 1300 may detect at least one object and a background in a first image and generate a second image by using at least one of an AI processor, a graphics processor, or a general-purpose processor in order to display different image effects by applying image filters to be applied to each of the detected at least one object and background.

According to an embodiment, the electronic device 1000 may perform general operations thereof by using a general-purpose processor (e.g., operations of obtaining a first image and outputting, on a display, a second image generated by applying image filters to the first image) and operations of generating a second image based on the first image by using an AI processor (e.g., operations of obtaining pieces of feature information regarding at least one object and a background, respectively, in the first image, determining image filters to be applied to the first image by using the obtained pieces of feature information, and applying the determined image filters to each of the at least one object and the background in the first image), but embodiments are not limited thereto.

That is, the electronic device 1000 may efficiently determine processing resources necessary for generating the second image and use at least one of a general-purpose processor, a graphics processor, or an AI processor based on the determined processing resources.

According to an embodiment, the processor 1300 may control the user inputter 1100 to receive a user's text, image, and video input. The processor 1300 may control a microphone 1620 to receive a user's voice input. The processor 1300 may execute an application for performing an operation of the electronic device 1000 based on a user input and control the executed application to receive a user input. For example, the processor 1300 may execute a voice assistant application and control the executed application to receive a user's voice input via the microphone 1620.

The processor 1300 may control the outputter 1200 and the memory 1700 of the electronic device 1000 to display first and second images. The processor 1300 may provide, on the display, candidate image filters to be applied to each of at least one object and a background in the first image and control the outputter 1200 and the memory 1700 to display, on the display, the first image obtained before the candidate image filters are applied, together with a second image to which the candidate image filters are applied.

The processor 1300 may train an AI model for detecting at least one object and background in a first image, determining an image filter for each of the at least one object and the background in the first image, and generating a second image by applying the image filter to each of the at least one object and the background in the first image.

According to an embodiment, the processor 1300 may train an AI model by using training data including image data before an image filter is applied or image data to which the image filter is applied. Furthermore, the processor 1300 may train an AI model based on an object and background model, a shooting model, or a composition and light source model prestored in the memory 1700 or a database (DB).

The processor 1300 may obtain training data for training an AI model from an input device in the electronic device 1000 or an external device capable of communicating with the electronic device 1000. For example, the processor 1300 may obtain original image data for or image data to which an image filter is applied, which are used to train an AI model, from another electronic device or a server connected to the electronic device 1000. In addition, the processor 1300 may receive an object and background model, a shooting model, or a composition and light source model for training an AI model from another electronic device or a server connected to the electronic device 1000.

According to an embodiment, the processor 1300 may preprocess pieces of data obtained for training an AI model For example, the processor 1300 may process obtained pieces of data into a preset format. According to an embodiment, the processor 1300 may select training data for training an AI model according to preset criteria (e.g., an area where the training data is generated, a time at which the training data is generated, a size of the training data, a genre of the training data, a creator of the training data, the type of an object in the training data, etc.) and also train a method of selecting criteria according to which the training data used for training the AI model is selected.

For example, one or a plurality of processors within the electronic device 1000 may control input data to be processed according to predefined operation rules or an AI model stored in the memory. Alternatively, when the one or plurality of processors are an AI processor, the AI processor may be designed with a hardware structure specialized for processing a particular AI model.

According to an embodiment, when the processor 1300 is implemented as a plurality of processors, a graphics processor, or a AI processor such as an NPU, at least some of the plurality of processors, graphics processor or AI processor such as an NPU may be mounted on the electronic device 1000 or another electronic device or the server 2000 connected to the electronic device 1000.

According to an embodiment, the predefined operation rules or AI model used for an operation of the electronic device 1000 may be created via a training process. The creation via the training process means that the predefined operation rules or AI model set to perform desired characteristics (or purpose) are created by training a basic AI model based on a large number of training data via a learning algorithm. The training process may be performed by a device itself in which AI is performed or via a separate server and/or system. Examples of a learning algorithm may include, but are not limited to, supervised learning, unsupervised learning, semi-supervised learning, and reinforcement learning.

A neural network model used by the processor 1300 to generate a second image may be an AI model operating to process input data according to predefined operation rules stored in the memory 1700, and the AI model may consist of a plurality of neural network layers in which weights for a strength of connections between the layers are trained.

Neural network models used by the processor 1300 to generate a second image may be trained based on a plurality of learning models stored in the memory 1700 or server 2000 (the object and background model 1822, the shooting model 1832, and the composition and light source model 1842). That is, the processor 1300 may train a first neural network that outputs pieces of feature information regarding at least one object and a background, respectively, in a first image based on information about an object and a background in an image, which is stored in the object and background model 1822, and train a second neural network that outputs candidate image filters to be applied to the first image when the pieces of feature information are input based on information about a shooting mode, which is stored in the shooting model 1832, and information about a composition and a light source, which is stored in the composition and light source model 1842. The processor 1300 may obtain a first image, obtain pieces of feature information regarding at least one object and a background respectively included in the obtained first image by using a first neural network prestored in the memory 1700, and generate a second image by applying an image filter to each of the at least one object and the background in the first image by using a second neural network that outputs at least one image filter to be applied to the first image when the pieces of feature information are input.

The sensor module 1400 may detect a status of the electronic device 1000 or the surroundings of the electronic device 1000 and transmit information about the detected status to the processor 1300. The sensor unit 1400 may be used to generate some of specification information of the electronic device 1000, status information of the electronic device 1000, surrounding environment information of the electronic device 1000, information about a user's status, and information about a user's device usage history.

The sensor unit 1400 may include at least one of a magnetic sensor 1410, an acceleration sensor 1420, a temperature/humidity sensor 1430, an infrared sensor 1440, a gyroscope sensor 1450, a position sensor (e.g., a global positioning system (GPS)) 1460, a barometric pressure sensor 1470, a proximity sensor 1480, and an RGB sensor (an illuminance sensor) 1490, but is not limited thereto. Because functions of each sensor may be inferred intuitively by those of ordinary skill in the art, detailed descriptions thereof will be omitted here.

The communicator 1500 may include one or more components that enable the electronic device 1000 to communicate with another device (not shown) and the server 2000. The other device may be a computing device such as the electronic device 1000 or a sensor device, but is not limited thereto. For example, the communicator 1500 may include a short-range wireless communication unit 1510, a mobile communication unit 1520, or a broadcast receiver 1530.

The short-range wireless communication unit 1510 may include a Bluetooth communication unit, a Bluetooth Low Energy (BLE) communication unit, a Near Field Communication (NFC) unit, a wireless local area network (WLAN) (or Wi-Fi) communication unit, a Zigbee communication unit, an Infrared Data Association (IrDA) communication unit, a Wi-Fi Direct (WFD) communication unit, an ultra-wideband (UWB) communication unit, or/and an Ant+ communication unit, but is not limited thereto.

The mobile communication unit 1520 transmits or receives a wireless signal to or from at least one of a base station, an external terminal, and a server on a mobile communication network. In this case, the wireless signal may be a voice call signal, a video call signal, or data in any one of various formats for transmission and reception of a text/multimedia message.

The broadcast receiver 1530 receives broadcast signals and/or broadcast-related information from the outside via a broadcast channel. The broadcast channel may include a satellite channel and a terrestrial channel. According to an embodiment, the electronic device 1000 may not include the broadcast receiver 1530. Furthermore, the communicator 1500 may transmit, to the server 2000, a first image or information about a background and an object detected in the first image.

According to an embodiment, the communicator 1500 transfers at least a part of the first image acquired by the electronic device 1000 or the first image acquired by the electronic device 1000 and stored in the memory 1700 to the server 2000. According to another embodiment, the communicator 1500 may transmit, to the server 2000, information about at least one object and a background detected in a first image (e.g., feature information including information about types of the at least one object and the background and location information regarding an object region and a background region).

According to an embodiment, the communicator 1500 may transmit, to the server 2000, an image stored in another electronic device connected to the electronic device 1000 and information about at least one object and a background in the image. For example, the communicator 1500 may transmit an identifier (e.g., a URL or metadata) of the first image to the server 2000.

According to an embodiment, the communicator 1500 may receive, from the server 2000, information about an image filter to be applied to the first image. According to an embodiment, the communicator 1500 may receive, from the server 2000, a second image in which an image effect is shown by applying an image filter to the first image.

The A/V inputter 1600 for inputting an audio or video signal may include a camera 1610, the microphone 1620, etc. The camera 1610 may obtain an image frame such as a still or video via an image sensor in a video call mode or shooting mode. An image captured via the image sensor may be processed by the processor 1300 or a separate image processor (not shown). An image captured by the camera 1610 may be used as user's contextual information.

The microphone 1620 receives an external sound signal and process the sound signal as electrical audio data. For example, the microphone 1620 may receive a sound signal from an external device or a user. The microphone 1620 may receive a user's voice input. The microphone 1620 may use various noise removal algorithms to remove noise generated in the process of receiving an external sound signal.

The memory 1700 may store programs necessary for processing or control performed by the processor 1300 or store data input to or output from the electronic device 1000. Furthermore, the memory 1700 may store an image and a result of searching for an image stored in the memory 1700. The memory 1700 may store information related to images stored in the electronic device 1000. For example, the memory 1700 may store a path where an image is stored, additional information related to the image, including a time when the image is captured, the object and background model 1822, the shooting model 1832, the composition and light source model 1842, etc.

In addition, the memory 1700 may further store a neural network trained based on the object and background model 1822, the shooting model 1832, the composition and light source model 1842, etc., layers for specifying an architecture of the neural network, and information about weights between the layers. For example, the memory 1700 may store not only a trained neural network but also an obtained original image; an image obtained by applying an image filter to the original image; an image obtained by modifying the applied image filter when, for an image to which a filter is applied, a user modifies the image filter that has already been applied, etc.

The memory 1700 may include at least one type of storage medium from among a flash memory-type memory, a hard disk-type memory, a multimedia card micro-type memory, a card-type memory (e.g., an SD card or an XD memory), random access memory (RAM), static RANI (SRAM), read-only memory (ROM), electrically erasable programmable ROM (EEPROM), PROM, a magnetic memory, a magnetic disc, or an optical disc.

Programs stored in the memory 1700 may be categorized into a plurality of modules according to their functions, such as a user interface (UI) module 1710, a touch screen module 1720, and a notification module 1730.

The UI module 1710 may provide, for each application, a specialized UI, a graphical UI (GUI), etc. interworking with the electronic device 1000. The touch screen module 1720 may detect a user's touch gesture on a touch screen and transmit information about the detected touch gesture to the processor 1300. According to some embodiments, the touch screen module 1720 may recognize and analyze a touch code. The touch screen module 1720 may be formed using separate hardware including a controller.

The notification module 1730 may generate a signal for notifying the occurrence of an event in the electronic device 1000. Examples of events occurring in the electronic device 1000 include call signal reception, message reception, key signal input, and schedule notification. The notification module 1730 may output a notification signal in the form of a video signal via the display 1210, a notification signal in the form of an audio signal via the audio outputter 1220, and a notification signal in the form of a vibration signal via the vibration motor 1230.

Figure 22:
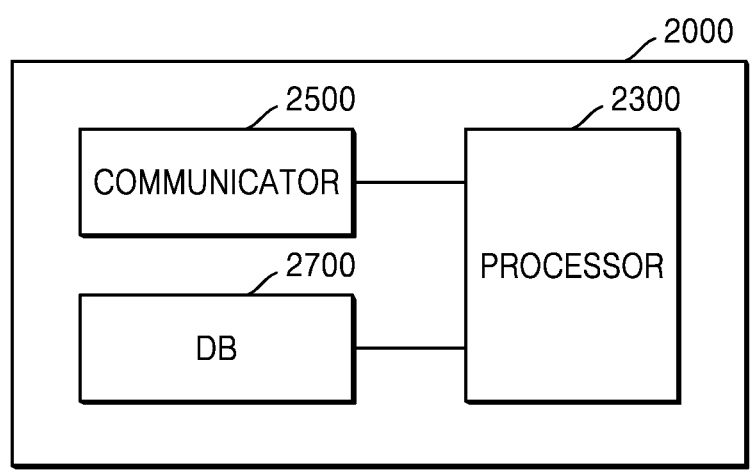
FIG. 22 is a block diagram of a server according to an embodiment.

FIG. 22 is a block diagram of a server 2000 according to an embodiment.

The server 2000 according to the present disclosure may include a processor 2300, a communicator 2500, and a DB 2700.

The communicator 2500 may include one or more components that enable communication with the electronic device 1000. The communicator 2500 may receive, from the electronic device 1000, a first image or information about at least one object and a background detected by the electronic device 1000 in the first image (e.g., pieces of feature information regarding the at least one object and the background, respectively). In addition, the communicator 2500 may transmit, to the electronic device 1000, information about image filters to be applied to each of the at least one object and the background in the first image.

The DB 2700 may store a plurality of learning models, i.e., the object and background model 1822, the shooting model 1832, and the composition and light source model 1842, a neural network trained based on the plurality of learning models, and training data input to the neural network. For example, the DB 2700 may store a first neural network that outputs pieces of feature information regarding at least one object and a background, respectively, in a first image and a second neural network that outputs an image filter to be applied to each of the at least one object and the background in the first image when the pieces of feature information are input. In addition, the DB 2700 may further store information related to images stored in the electronic device 1000 (e.g., a path where an image is stored, additional information related to the image including a time when the image is captured, etc.). According to another embodiment, the DB 2700 may store an original image to which an image filter is not applied, an image obtained by applying at least one image filter, an image obtained by modifying the applied image filter when, for an image to which a filter is applied, the user modifies the image filter that has already been applied, etc.

The processor 2300 generally controls all operations of the server 2000. For example, the processor 2300 may control all operations of the DB 2700 and the communicator 2500 by executing programs stored in the DB 2700 of the server 2000. The processor 2300 may perform some of the operations of the electronic device 1000 described with reference to FIGS. 1 through 20 by executing programs stored in the DB 2700.

The processor 2300 may perform at least one of a function of obtaining pieces of feature information regarding at least one object and a background, respectively, from a first image, a function of analyzing a composition of the first image based on the obtained pieces of feature information regarding the object and the background, respectively, a function of determining a shooting mode of the electronic device 1000 for capturing the first image, a function of determining information about a light source included in the first image, and a function of obtaining pieces of additional information related to the first image.

The processor 2300 may manage at least one of data necessary to obtain pieces of feature information regarding at least one object and a background, respectively, from a first image, data necessary to analyze a composition of the first image based on the obtained pieces of feature information, data necessary to determine information about a light source in the first image, and data necessary to determine a shooting mode of the electronic device 1000 for capturing the first image.

A method, performed by an electronic device, of obtaining an image according to an embodiment may be implemented in the form of program instructions executable by various types of computers and may be recorded on computer-readable recording media. The computer-readable recording media may be any available media that are accessible by a computer and include both volatile and nonvolatile media and both detachable and non-detachable media. Furthermore, the computer-readable recording media may include both computer storage media and communication media.

Examples of the computer-readable recording media include magnetic media such as hard disks, floppy disks, and magnetic tapes, optical media such as compact disk-ROM (CD-ROM) and digital versatile disks (DVDs), magneto-optical media such as floptical disks, and hardware devices, such as ROM, RAM, flash memory, etc., which are implemented using any method or technology for storing information such as computer-readable instructions, data structures, program modules, or other data. Examples of program instructions include not only machine code such as that generated by a compiler but also higher level language code executable by a computer using an interpreter or the like.

In addition, a computer program device or a computer program product including a recording medium having stored therein a program that causes an electronic device to perform a method of obtaining an image according to an embodiment may be provided.

Furthermore, in the present specification, the term "unit" may be a hardware component such as a processor or circuit and/or a software component that is executed by a hardware component such as a processor.

The above description of the present disclosure is provided for illustration, and it will be understood by those of ordinary skill in the art that changes in form and details may be readily made therein without departing from technical idea or essential features of the present disclosure. Accordingly, the above embodiments and all aspects thereof are merely examples and are not limiting. For example, each component defined as an integrated component may be implemented in a distributed fashion, and likewise, components defined as separate components may be implemented in an integrated form.

The scope of the present disclosure is defined not by the detailed description thereof but by the following claims, and all the changes or modifications within the meaning and scope of the appended claims and their equivalents will be construed as being included in the scope of the present disclosure.

The invention claimed is:

1. A method, performed by an electronic device, of obtaining an image, the method comprising:
   obtaining a first image including at least one object and a background;
   detecting the at least one object and the background in the obtained first image, based on feature information regarding the at least one object and the background, respectively, in the first image;
   determining image filters exhibiting different image effects, which are to be applied to each of the detected at least one object and the detected background; and
   generating a second image by applying the determined image filters to each of the at least one object and the background,
   wherein the determining of the image filters comprises:
      analyzing a composition of the first image based on a relative positional relationship between the detected background and the detected at least one object;
      when a proportion of the detected background occupying the obtained first image is greater than or equal to a preset threshold, determining information about a light source in the first image based on values of pixels in the first image; and
      determining the image filters based on at least one of the determined information about the light source and the composition.

2. The method of claim 1, wherein the detecting of the at least one object and the background comprises, when the obtained first image is input, obtaining the feature information regarding the at least one object and the background, respectively, by using a first neural network that outputs feature information for identifying an object region including an image of a portion corresponding to the at least one object and a background region including an image of a portion corresponding to the background.

3. The method of claim 2, wherein the feature information comprises:
   information about a type of the at least one object or the background; and
   location information for determining locations of the object region and the background region in the first image.

4. The method of claim 2, wherein the detecting of the at least one object and the background comprises:
   determining location information for determining the object region and the background region in the obtained first image; and
   detecting the object region and the background region in the first image based on the determined location information.

5. The method of claim 4, wherein the obtaining of the feature information comprises:
   determining information about types of the at least one object and the background respectively included in the object region and the background region; and
   obtaining the feature information based on the determined information about the types of the at least one object and the background and the determined location information.

6. The method of claim 2, wherein the generating of the second image comprises:
   adjusting a size and an application range of the determined image filters; and
   applying the image filters whose size and application range have been adjusted for each of the object region and the background region.

7. The method of claim 1, wherein the determining of the image filters comprises, when the feature information is input, determining the image filters by using a second neural network that outputs the image filters to be applied to the first image.

8. The method of claim 1, wherein the determining of the image filters comprises:
   determining a shooting mode of the electronic device for capturing the first image, by using the feature information; and
   determining the image filters based on shooting parameters determined according to the determined shooting mode.

9. A non-transitory computer-readable recording medium having recorded thereon a program for performing the method of claim 1 on a computer.

10. An electronic device comprising:
    a display displaying at least one image;
    a storage storing one or more instructions; and
    a processor configured to execute the one or more instructions to:

obtain a first image including at least one object and a background, detect the at least one object and the background in the obtained first image, based on feature information regarding the at least one object and the background, respectively, in the first image, determine image filters exhibiting different image effects, which are to be applied to each of the detected at least one object and the background, generate a second image by applying the determined image filters to each of the at least one object and the background, wherein the processor, to determine the image filters, is further configured to execute the one or more instructions to:

analyze a composition of the first image based on a relative positional relationship between the detected background and the detected at least one object, when a proportion of the detected background occupying the obtained first image is greater than or equal to a preset threshold, determine information about a light source in the first image based on values of pixels in the first image, and determine the image filters based on at least one of the determined information about the light source and the composition.

11. The electronic device of claim 10, wherein the processor is further configured to, when the obtained first image is input, obtain the feature information by using a first neural network that outputs feature information for identifying an object region including an image of a portion corresponding to the at least one object and a background region including an image of a portion corresponding to the background.

12. The electronic device of claim 11, wherein the processor is further configured to:

determine location information for determining the object region and the background region in the obtained first image, and detect the object region and the background region in the first image based on the determined location information.

13. The electronic device of claim 10, wherein the processor is further configured to, when the feature information is input, determine the image filters by using a second neural network that outputs the image filters to be applied to the first image.

* * * * *